United States Patent
Oberoi et al.

(10) Patent No.: US 11,305,390 B2
(45) Date of Patent: *Apr. 19, 2022

(54) METHOD AND APPARATUS FOR SINGLE-SIDED CLAMP-UP

(71) Applicant: The Boeing Company, Chicago, IL (US)

(72) Inventors: Harinder S. Oberoi, Snohomish, WA (US); Kevin Marion Barrick, Kingston, WA (US); Charles Yuanxin Hu, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 542 days.

This patent is subject to a terminal disclaimer.

(21) Appl. No.: 16/230,280

(22) Filed: Dec. 21, 2018

(65) Prior Publication Data

US 2020/0198072 A1 Jun. 25, 2020

(51) Int. Cl.

| | |
|---|---|
| *B23Q 3/00* | (2006.01) |
| *B23Q 3/08* | (2006.01) |
| *B64C 1/06* | (2006.01) |
| *F16B 5/04* | (2006.01) |
| *B25J 15/00* | (2006.01) |
| *B23B 39/14* | (2006.01) |
| *F16B 1/00* | (2006.01) |
| *B25J 15/06* | (2006.01) |

(52) U.S. Cl.
CPC .............. *B23Q 3/088* (2013.01); *B23B 39/14* (2013.01); *B25J 15/0019* (2013.01); *B25J 15/0616* (2013.01); *B64C 1/069* (2013.01); *F16B 1/0057* (2013.01); *F16B 5/04* (2013.01); *B23Q 2703/04* (2013.01)

(58) Field of Classification Search
CPC . B23Q 3/00; B23Q 3/088; B23Q 5/00; B23Q 5/06; B23Q 5/26; B25B 11/00; B25B 11/002

See application file for complete search history.

(56) References Cited

U.S. PATENT DOCUMENTS

| | | | |
|---|---|---|---|
| 4,885,836 A | 12/1989 | Bonomi et al. | |
| 4,936,726 A | 6/1990 | Medard | |
| 5,042,787 A | 8/1991 | Duffaud | |
| 5,749,671 A | * 5/1998 | Chauquet | H01R 4/30 174/88 B |
| 6,088,897 A | 7/2000 | Banks et al. | |
| 8,474,806 B2 | * 7/2013 | Orgeron | B25B 5/061 269/218 |

(Continued)

FOREIGN PATENT DOCUMENTS

| | | |
|---|---|---|
| EP | 0338117 A2 | 10/1989 |
| EP | 2116340 A1 | 11/2009 |
| EP | 2965872 A2 | 1/2016 |

OTHER PUBLICATIONS

U.S. Appl. No. 16/230,189, filed Dec. 21, 2018.

(Continued)

*Primary Examiner* — Lee D Wilson
(74) *Attorney, Agent, or Firm* — Haynes and Boone, LLP

(57) ABSTRACT

Methods and apparatuses for providing a clamp-up are provided. The methods and apparatuses include reaching through a first hole in a first part to grip a wall that defines a second hole in a second part to thereby pull the second part against the first part.

29 Claims, 21 Drawing Sheets

(56) References Cited

U.S. PATENT DOCUMENTS

| | | | |
|---|---|---|---|
| 2004/0075206 | A1 | 4/2004 | Starr |
| 2011/0245971 | A1 | 10/2011 | Sarh et al. |
| 2012/0011693 | A1 | 1/2012 | Amirehteshami et al. |
| 2013/0341847 | A1 | 12/2013 | Bense et al. |
| 2016/0011593 | A1 | 1/2016 | Oberoi et al. |
| 2016/0243702 | A1 | 8/2016 | Crothers |
| 2017/0008094 | A1 | 1/2017 | Nguyen et al. |
| 2018/0326507 | A1 | 11/2018 | Halvorsen et al. |
| 2020/0198071 | A1* | 6/2020 | Oberoi .................. B23B 39/14 |
| 2020/0198072 | A1* | 6/2020 | Oberoi .................. B23B 35/00 |
| 2020/0198073 | A1* | 6/2020 | Oberoi .................. B64C 1/069 |

OTHER PUBLICATIONS

U.S. Appl. No. 16/230,370, filed Dec. 21, 2018.
U.S. Appl. No. 16/230,441, filed Dec. 21, 2018.
U.S. Appl. No. 16/230,522, filed Dec. 21, 2018.
U.S. Appl. No. 16/229,402, filed Dec. 21, 2018.
Extended European Search Report dated May 27, 2020 from European Patent Application No. 19218372.1; pp. 1-11.
Extended European Search Report dated May 26, 2020 from European Patent Application No. 19218373.9; pp. 1-10.
Extended European Search Report dated May 26, 2020 from European Patent Application No. 19218374.7; pp. 1-10.
Extended European Search Report dated May 26, 2020 from Emopean Patent Application No. 19218376.2; pp. 1-10.
Extended European Search Report dated Jun. 2, 2020 from Emopean Patent Application No. 19218869.6; pp. 1-12.
Extended European Search Report dated May 26, 2020 from Emopean Patent Application No. 19218877.9; pp. 1-14.
Extended European Search Report dated Jun. 2, 2020 from Emopean Patent Application No. 19218998.3; pp. 1-14.
Marino A. et al: "A general low-cost and flexible architecture for robotized drilling in aircraft assembly lines," 2016 International Symposium on Power Electronics, Electrical Drives, Automation and Motion (SPEEDAM), IEEE, Jun. 22, 2016; pp. 1401-1408.
Wikipedia; Robot end effector; Downloaded May 31, 2020 from https://en.wikipedia.org/w/index.php?title=Robot_end_effector&oldid=950165238, Edited Apr. 10, 2020. Text is available under the Creative Commons Albibution-ShareAlike License; 5 pages.
Mir, R. and DeVlieg, R., "777X Control Surface Assembly Using Advanced Robotic Automation," SAE Technical Paper 2017-01-2092, 2017, doi: 10 4271/2017-01-2092, 7 pages.
Everhart, T., "Neighboring Mobile Robot Cell with Drilling and Fastening," SAE Technical Paper 2017-01-2094, 2017, doi:10.4271/2017-01-2094, 3 pages.

* cited by examiner

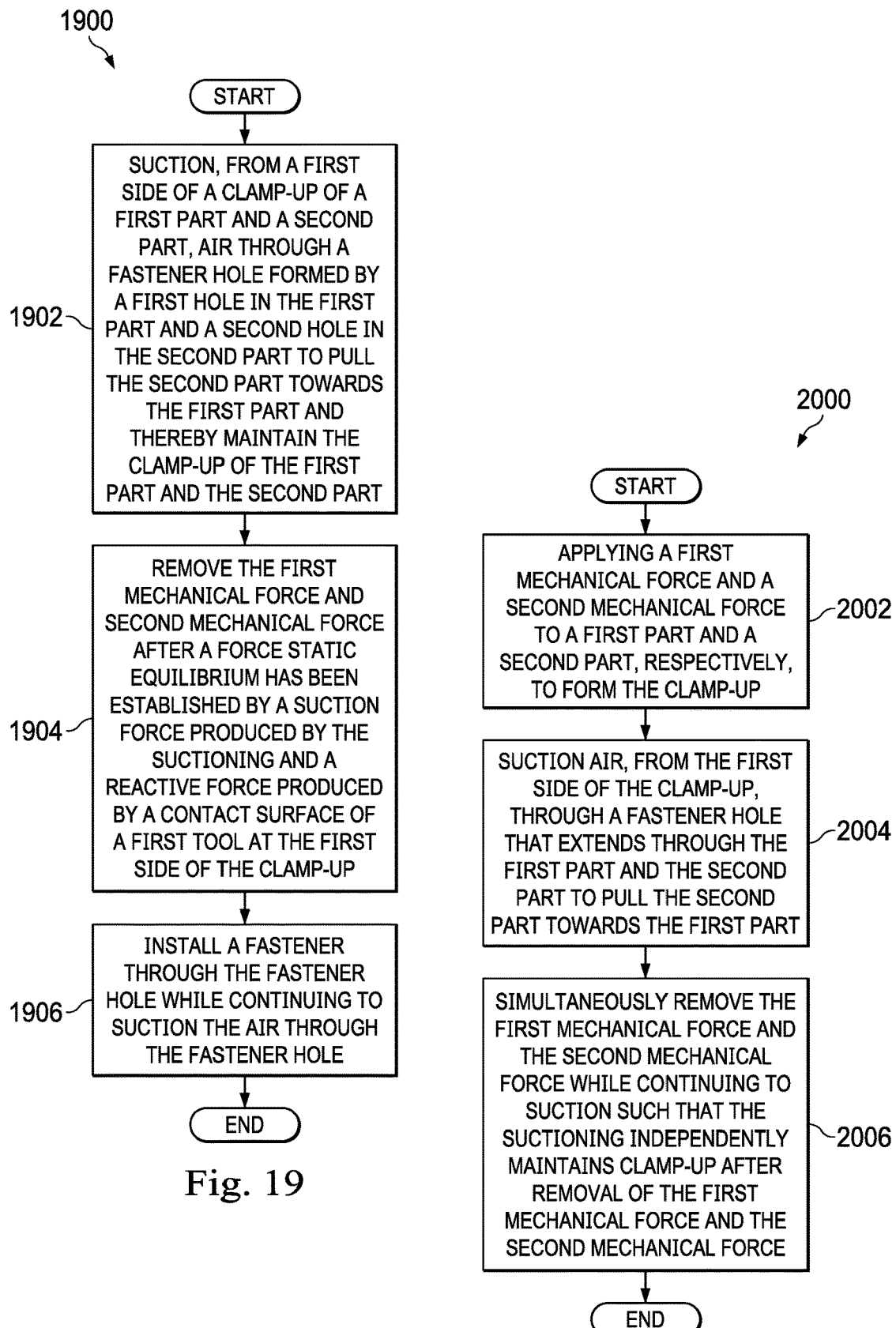

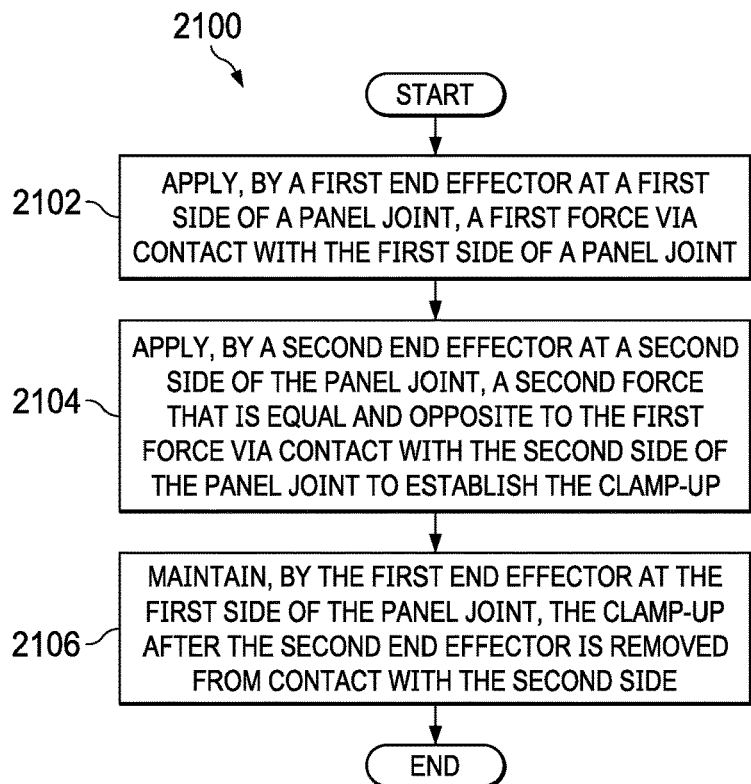
Fig. 21
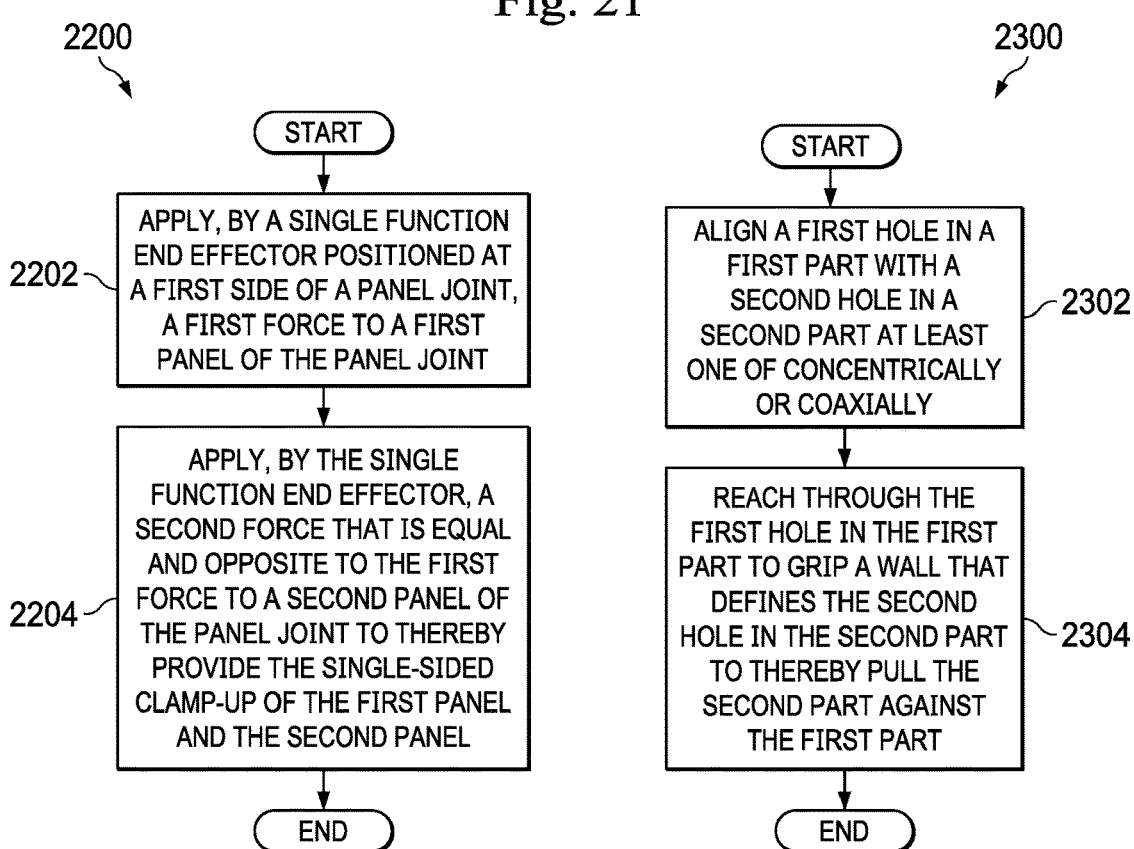
Fig. 22
Fig. 23

METHOD AND APPARATUS FOR SINGLE-SIDED CLAMP-UP

CROSS-REFERENCE TO RELATED APPLICATIONS

This application is related to U.S. patent application Ser. No. 16/230,189, filed Dec. 21, 2018, entitled "Method and Apparatus for Single-Sided Clamp-up;" U.S. patent application Ser. No. 16/230,370, filed Dec. 21, 2018, entitled "Method and Apparatus for Single-Sided Clamp-up;" U.S. patent application Ser. No. 16/230,441, filed Dec. 21, 2018, entitled "High-Density Robotic System;" and U.S. patent application Ser. No. 16/230,522, filed Dec. 21, 2018, entitled "High-Density Robotic System," each of which is incorporated herein by reference in its entirety.

FIELD

This disclosure generally relates to the assembly of parts and, more particularly, to methods and apparatuses that use suction to establish a single-sided clamp-up of parts, maintain a single-sided clamp-up of parts, or both.

BACKGROUND

Automating certain operations during the assembly of structures may increase assembly accuracy, improve assembly efficiency, and reduce overall assembly. For example, the tasks involved in the joining of two parts may be automated. These tasks may include clamping together the two parts, drilling holes through the two parts, inspecting the drilled holes, and inserting fasteners through the drilled holes.

Currently, some fastener installation operations are automated using robots with multi-function end effectors. A multi-function end effector may be a machine with multiple moving parts that work together to perform the various tasks involved in fastener installation, including clamping, drilling, inspection, and fastener insertion. One or more of these tasks may require that parts be held in place together (e.g., clamped up) in order for a fastener to be installed through the parts. Some currently available systems for maintaining the clamp-up of parts may be more complex and less efficient than desired for performing certain types of assembly operations.

SUMMARY

In another example embodiment, a method is provided for maintaining a clamp-up. Air is suctioned from a first side of a clamp-up of a first part and a second part through a fastener hole formed by a first hole in the first part and a second hole in the second part to pull the second part towards the first part and thereby provide the clamp-up of the first part and the second part.

In yet another example embodiment, a method for maintaining a clamp-up is provided. A first end effector at a first side of a panel joint applies a first force via contact with the first side of a panel joint. A second end effector at a second side of the panel joint applies a second force that is equal and opposite to the first force via contact with the second side of the panel joint to establish the clamp-up. The first end effector at the first side of the panel joint maintains the clamp-up after the second end effector is removed from contact with the second side.

In still yet another example embodiment, a method for a single-sided clamp-up is provided. A single function end effector positioned at a first side of a panel joint applies a first force to a first panel of the panel joint. The single function end effector applies a second force that is equal and opposite to the first force to a second panel of the panel joint to thereby provide the single-sided clamp-up of the first panel and the second panel.

In another example embodiment, a method of providing a clamp-up is provided. The method includes reaching through a first hole in a first part to grip a wall that defines a second hole in a second part to thereby pull the second part against the first part.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the example embodiments are set forth in the appended claims. The example embodiments, however, as well as a preferred mode of use, further objectives and features thereof, will best be understood by reference to the following detailed description of an example embodiment of the present disclosure when read in conjunction with the accompanying drawings.

FIG. 19 is a flowchart of a process for maintaining a single-sided clamp-up in accordance with an example embodiment.

FIG. 20 is a flowchart of a process for maintaining a single-sided clamp-up in accordance with an example embodiment.

FIG. 21 is a flowchart of a process for maintaining a single-sided clamp-up in accordance with an example embodiment.

FIG. 22 is a flowchart of a process for maintaining a single-sided clamp-up in accordance with an example embodiment.

FIG. 23 is a flowchart of a process for providing a clamp-up in accordance with an example embodiment.

DETAILED DESCRIPTION

Figure 1:
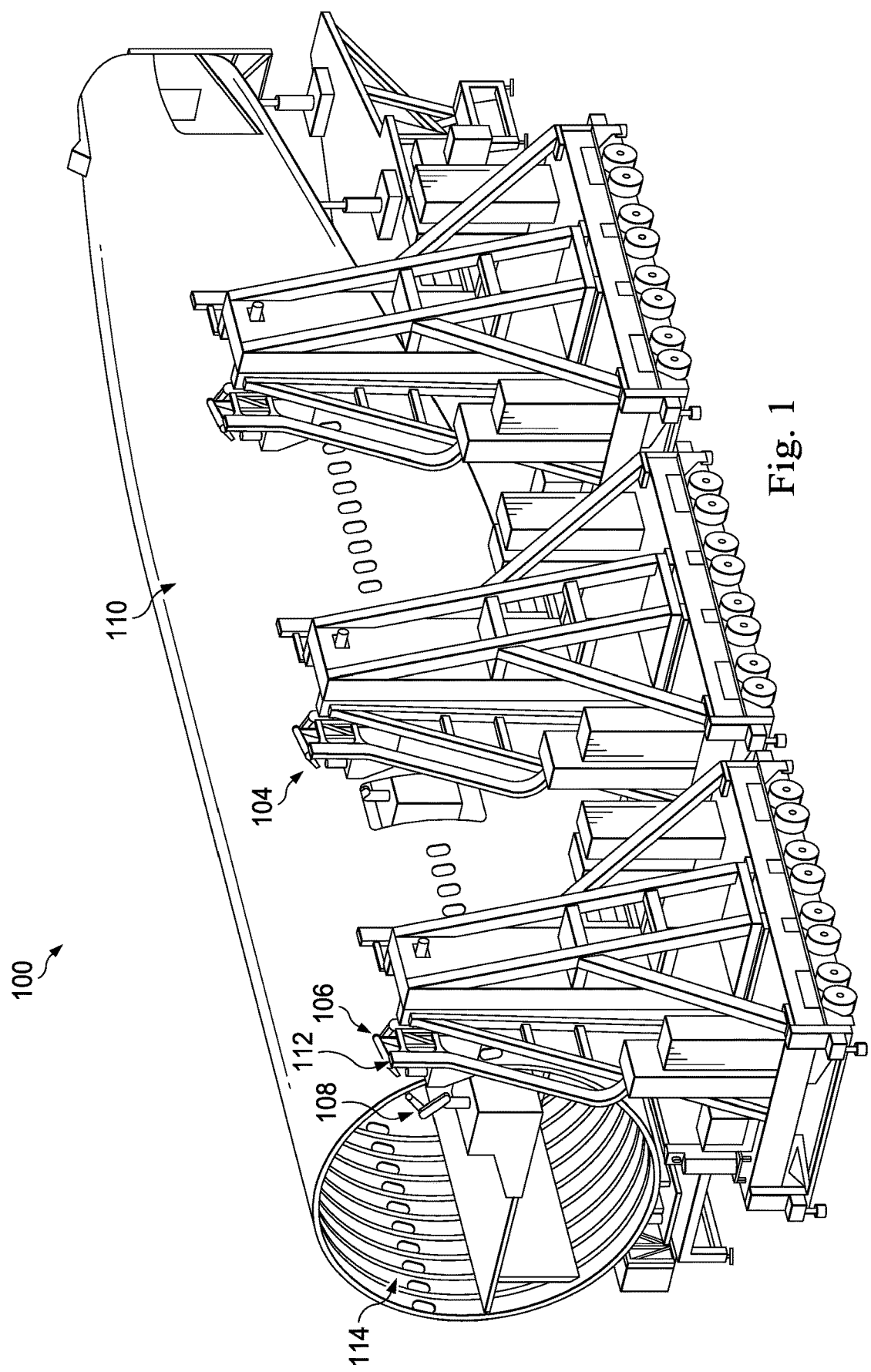
FIG. 1 is an illustration of a perspective view of manufacturing environment 100 in accordance with an example embodiment.

The example embodiments described below provide methods and apparatuses for improving the efficiency and ease of joining parts together. For example, the methods and apparatuses described below may improve the efficiency and ease and reduce the complexity of installing fasteners to join parts together. The example embodiments recognize and take into account that single function end effectors allow the various tasks (e.g., drilling, inspection, fastener insertion) of a fastener installation operation to be separated. By using a different single function end effector for the different tasks, the end effectors may be made smaller, lighter, and less complex than multifunction end effectors.

The simplicity of single function end effectors may help improve the overall efficiency and reliability of using end effectors to automate fastener installation operations. Further, the simplicity of single function end effectors may reduce the amount of maintenance required, the overall size of the supporting robot and associated structure, or both.

In particular, the example embodiments recognize and take into account that the parts of an assembly through which a fastener is being installed need to be held in place together (e.g., clamped together) while the single function end effectors are being switched out to perform the various tasks. The example embodiments provide methods and apparatuses for holding these parts together from one side of the assembly to enable the switching out of single function end effectors on the other side of the assembly.

In one example embodiment, a method is provided for automating a fastener installation. A first mechanical force is applied to a first part and a second mechanical force is applied to a second part to form a clamp-up of the first part and the second part. Air is suctioned through a fastener hole, which is formed by a first hole in the first part that is aligned with a second hole in the second part, to pull the second part towards the first part and thereby maintain the clamp-up of the first part and the second part even after the second mechanical force has been removed.

In another example embodiment, method is provided for aligning a first hole in a first panel with a second hole in a second panel to define a through-hole. A wall that defines the second hole is gripped from within the through-hole to pull the second panel towards the first panel and thereby establish a clamp-up of the first panel and the second panel.

In yet another example embodiment, a method is provided for using a single function end effector to maintain a clamp-up. The single function end effector is positioned at one side of a panel joint and applies both a first force on a first panel of the panel joint and a second force on a second panel of the panel joint to maintain the clamp-up. The first force may be, for example, a suction force, while the second force may be, for example, a reactive force applied in response to the suction force. In this manner, a single-sided clamp-up is achieved.

Thus, the example embodiments provide methods and systems for establishing a clamp-up, maintaining a clamp-up, or both of a first panel and a second panel. These methods and systems involve gripping a wall that defines a hole in the second panel from within a hole in the first panel to pull the second panel towards the first panel. The first hole and the second hole form a through-hole extending through the first panel and the second panel.

This gripping may be performed by, for example, drawing a partial vacuum (e.g., suctioning) through a fastener hole (e.g., the through-hole) in a direction from the second panel towards the first panel. This gripping force is combined with an opposing force (e.g., a reactive force) created by the single function end effector being positioned in contact with the first panel. In this manner, single-sided clamp-up is achieved. The clamp-up is formed from the side of the first panel to allow movement of tools and devices and provide space for any number of operations to be performed at the side of the second panel.

In some cases, one or more panels may be present between the first panel and the second panel. The fastener hole extends through the first panel, the second panel, and any number of panels between the first and second panels. In other cases, sealant is applied on the faying surfaces of one or both of the first and second panels.

Referring now to the figures, FIG. 1 is an illustration of a perspective view of manufacturing environment 100 in accordance with an example embodiment. Within manufacturing environment 100, fuselage assembly 102 is being built. In this illustrative example, plurality of assembly systems 104 is positioned relative to fuselage assembly 102.

Assembly system 106 is an example of one of plurality of assembly systems 104. Assembly system 106 includes robotic devices 108 positioned relative to exterior 110 of fuselage assembly 102 and robotic devices 112 positioned relative to interior 114 of fuselage assembly 102. Robotic devices 108 and robotic devices 112 work together to perform fastener installation operations for the building of fuselage assembly 102.

Figure 2:
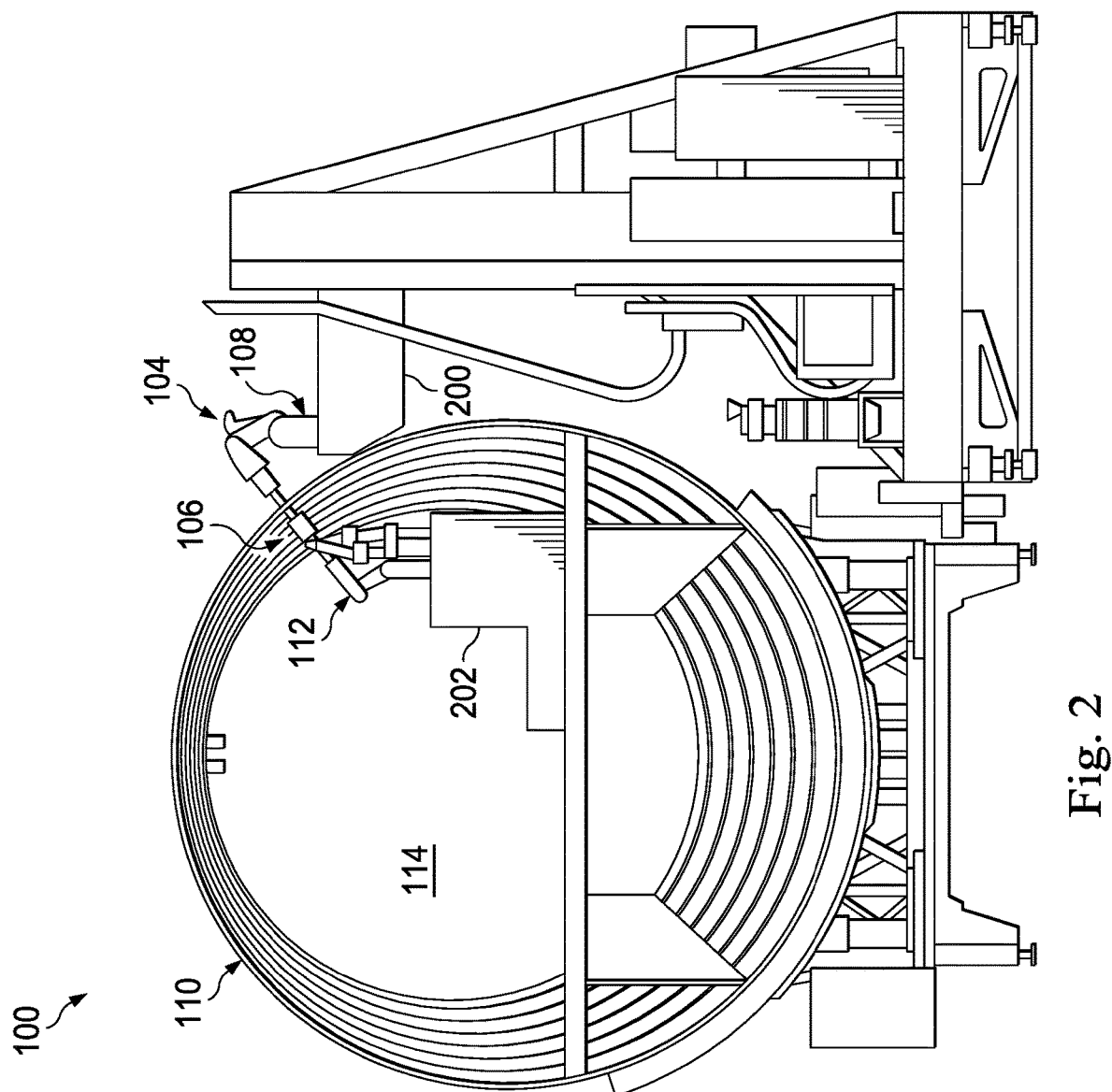
FIG. 2 is an illustration of an end view of the fuselage assembly from FIG. 1 being built in accordance with an example embodiment.

FIG. 2 is an illustration of an end view of fuselage assembly 102 being built in accordance with an example embodiment. As depicted, robotic devices 108 are supported by platform 200 and robotic devices 112 are supported by platform 202. Robotic devices 108 and robotic devices 112 work together to install fasteners that join fuselage panels together to build fuselage assembly 102.

In this illustrative example, robotic devices 108 are coupled with end effectors for performing drilling, inspection, and fastener insertion tasks. These end effectors are single function end effectors that may be switched out by being moved around relative to, for example, fastener installation point 113 to perform their individual tasks. A single function end effector is an end effector used to perform a single function per robotic device per fastener installation point. In some cases, robotic devices 108 are moved around on platform 200 in order to position the end effector for a particular task relative to fastener installation point 113. In other cases, robotic devices 108 may remain stationary on platform 200 but may be used to move their end effectors around in order to position the proper end effector for a given task relative to fastener installation point 113.

Each of robotic devices 112 is coupled with an end effector that is used to hold together the fuselage panels from the interior side of fuselage assembly 102 during the switching out of the single function end effectors coupled to robotic devices 108. For example, after the end effector on one of robotic devices 108 has been used to perform its designated task, that end effector may be moved away from fastener installation point 113 to make room for a different end effector. An end effector coupled to one of robotic devices 112 is used to maintain the clamp-up of the fuselage panels from only the interior side of fuselage assembly 102, while the end effectors are being switched around on the exterior side of fuselage assembly 102.

Figure 3:
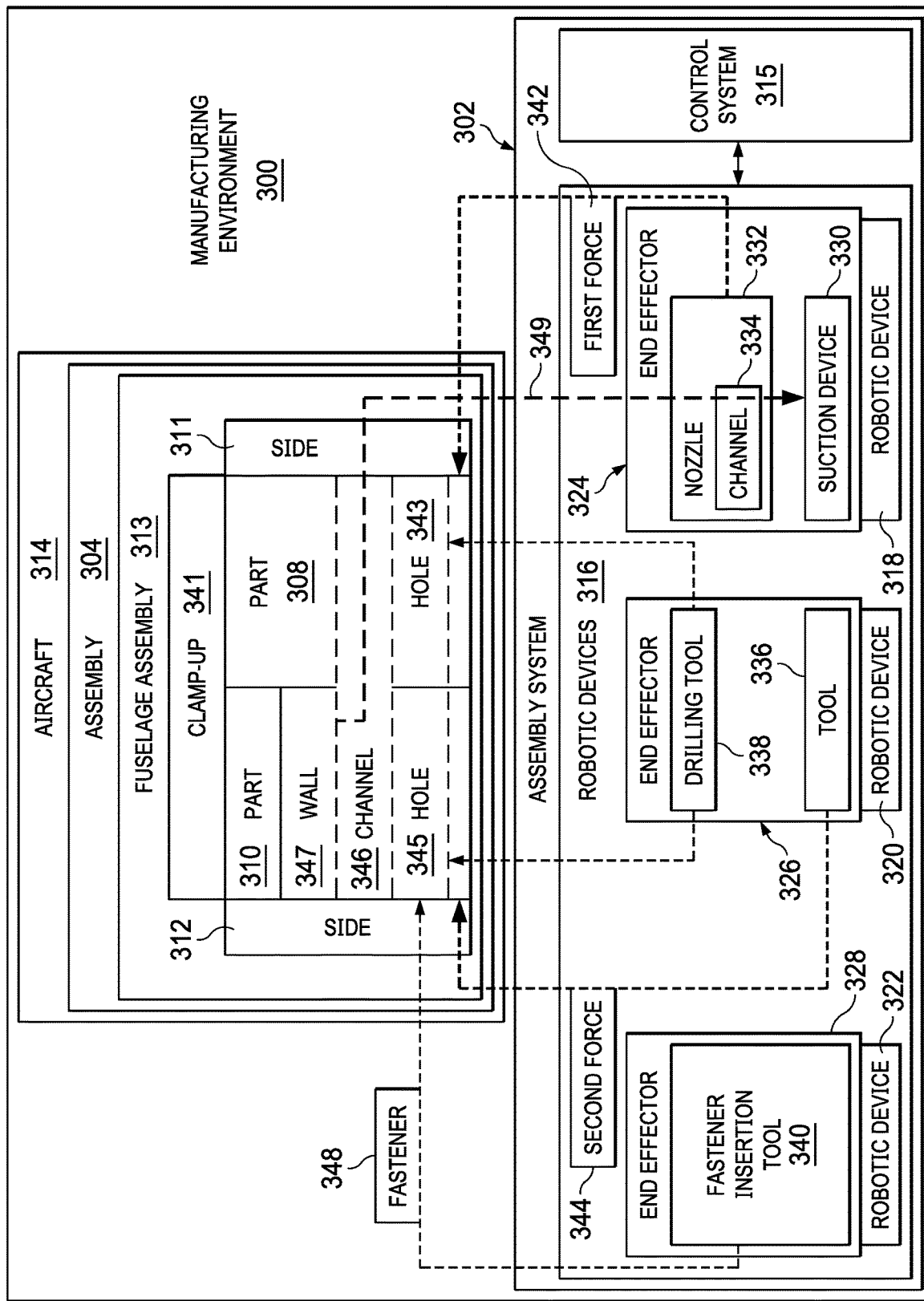
FIG. 3 is a block diagram of a manufacturing environment in accordance with an example embodiment.

FIG. 3 is a block diagram of a manufacturing environment 300 in accordance with an example embodiment. Manufacturing environment 100 in FIG. 1 is an example of one implementation for manufacturing environment 300. Within manufacturing environment 300, assembly system 302 is used to build assembly 304.

Assembly 304 includes part 308 and part 310. Part 308 and part 310 are mated to form a joint (not shown) in assembly 304. Side 311 of part 308, which forms a first side of the joint, faces opposite part 310. Side 312 of part 310, which forms a second side of the joint, faces opposite part 308.

Although assembly 304 is described as having only two parts in these example embodiments, in other cases, assembly 304 may include more than two parts. In one illustrative example, assembly 304 takes the form of fuselage assembly 313 of aircraft 314. In one example, part 308 and part 310 take the form of fuselage panels. In other examples, part 308 and part 310 take the form of other types of aircraft parts, such as wing panels. When part 308 and part 310 take the form of panels, they together form a panel joint.

Assembly system 106 in FIG. 1 is an example of one implementation for assembly system 302. Assembly system 302 includes control system 315 and plurality of robotic devices 316. Control system 315 controls the operation of robotic devices 316. Control system 315 is implemented using software, hardware, firmware, or a combination thereof.

When software is used, the operations performed by control system 315 may be implemented using, for example, without limitation, program code configured to run on a processor unit. When firmware is used, the operations performed by control system 315 may be implemented using, for example, without limitation, program code and data and stored in persistent memory to run on a processor unit.

When hardware is employed, the hardware may include one or more circuits that operate to perform the operations performed by control system 315. Depending on the implementation, the hardware may take the form of a circuit system, an integrated circuit, an application specific integrated circuit (ASIC), a programmable logic device, or some other suitable type of hardware device configured to perform any number of operations. A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In these illustrative examples, control system 315 may be implemented using a computer system. The computer system may include a single computer or multiple computers in communication with each other.

Plurality of robotic devices 316 includes, for example, without limitation, robotic device 318, robotic device 320, and robotic device 322. Robotic device 318, robotic device 320, and robotic device 322 are coupled with end effector 324, end effector 326, and end effector 328, respectively. Each of these end effectors may be considered a single function end effector. In some illustrative examples, end effector 324, end effector 326, and end effector 328 are considered part of robotic device 318, robotic device 320, and robotic device 322, respectively. In other illustrative examples, end effector 324, end effector 326, and end effector 328 are considered separate from but attachable to and detachable from robotic device 318, robotic device 320, and robotic device 322.

In one example embodiment, end effector 324 includes suction device 330 and a tool, which may be nozzle 332, coupled to suction device 330. Nozzle 332 is directly or indirectly coupled to suction device 330. In these illustrative examples, nozzle 332 may be an elongated member with channel 334 that extends through nozzle 332. Suction device 330 generates suction that with sufficient power, suctions air into and through channel 334 within nozzle 332.

End effector 326 includes tool 336 and drilling tool 338. In some illustrative examples, tool 336 is a cylindrical member that surrounds drilling tool 338. End effector 328 includes fastener insertion tool 340.

To perform a fastener installation, end effector 324 and end effector 326 are positioned on opposite sides of assembly 304. These end effectors are used to apply equal and opposite forces (e.g., first force 342 and second force 344 to part 308 and part 310, respectively) to form clamp-up 341. In particular, end effector 324 and end effector 326 are operated to apply equal and opposite forces to side 311 of part 308 and side 312 of part 310, respectively, to form clamp-up 341.

For example, at least one of robotic device 318 or end effector 324 is operated to apply first force 342 to side 311 of part 308 using nozzle 332. First force 342 is a first mechanical force, which may also be referred to as a clamping force in some cases. In some cases, end effector 324 includes an extension system for moving nozzle 332 towards side 311 to apply first force 342 to part 308. Further, at least one of robotic device 320 or end effector 326 may be operated to apply second force 344 to the other side of assembly 304 using tool 336. Second force 344 is a second mechanical force, which may also be referred to as a clamping force in some cases. In some cases, end effector 326 includes an extension system for moving tool 336 towards side 312 to apply second force 344 to part 310.

In one example, nozzle 332 and tool 336 are simultaneously extended towards and pressed against part 308 and part 310, respectively, to apply first force 342 to part 308 and second force 344 to part 310. Nozzle 332 and tool 336 are pressed against part 308 and part 310, respectively, until the desired force static equilibrium is achieved between first force 342 and second force 344. In other words, nozzle 332 and tool 336 are pressed or pushed against part 308 and part 310, respectively, until first force 342 and second force 344, which are equal and opposite forces, reach amounts sufficient to establish clamp-up 341 of part 308 and part 310.

Once clamp-up 341 is achieved, nozzle 332 and tool 336 are held in fixed positions with respect to the reference coordinate system. Thus, clamp-up 341 is maintained in a fixed position relative to the reference coordinate system by the force static equilibrium created by the positioning of nozzle 332 and tool 336 with respect to the reference coordinate system.

In some illustrative examples, clamp-up 341 includes part 308, part 310, with both having sealant applied to the faying surfaces of these parts. In other words, the clamp-up may include the sealant sealing these parts together. This type of clamp-up 341 of part 308 and part 310 may be used for "one-up" assembly.

In some illustrative examples, drilling tool 338 is used to drill hole 343 through part 308 and hole 345 through part 310 while clamp-up 341 of these parts is maintained using suction 349. Drilling tool 338 is positioned at side 312 such that the drilling of both hole 343 and hole 345 is performed from side 312. In this manner, hole 345 is formed before hole 343. In one or more examples, drilling tool 338 includes a suction device or some other type of cleanup device that is used to help remove part shavings or castoffs that are created during drilling.

Maintaining clamp-up 341 of these parts during drilling ensures that hole 343 and hole 345 are aligned during and after drilling to form fastener hole 346. Further, maintaining clamp-up 341 of these parts during drilling may also help maintain clamp-up of a sealant (not shown) between part 308 and part 310; prevent gaps between part 308 and part 310; prevent drill filings, shavings, or castoffs from falling through or otherwise entering one or more gaps between part 308 and part 310; reduce or eliminate a need to deburr edges of hole 343 and hole 345 after drilling; or a combination thereof.

Hole 343 in part 308 and hole 345 in part 310 are formed concentrically and coaxially. Fastener hole 346 may also be referred to as a channel or a through-hole. As used herein, a through-hole is a hole that passes through two or more parts and is thereby formed by the coaxial holes through these two or more parts.

Prior to installation of fastener 348 within fastener hole 346, end effector 326 needs to be switched out for end effector 328 having fastener insertion tool 340. But because tool 336 of end effector 326 is being used to maintain clamp-up 341, a different mechanism for maintaining clamp-up 341 is needed before end effector 328 can be switched out. For example, movement of tool 336 away from part 310 or movement of nozzle 332 away from part 308, without some additional mechanism for maintaining clamp-up 341, could undo clamp-up 341. Accordingly, a mechanism for maintaining clamp-up 341 while still allowing end effector 326 to be switched out with end effector 328 is needed.

Suction device 330 of end effector 324 is used to maintain clamp-up 341 from only side 311 to thereby allow end effector 326 at side 312 to be switched out with end effector 328. In particular, suction device 330 generates suction 349 to suction air through fastener hole 346 from side 311. Suctioning is performed while the force static equilibrium between first force 342 and second force 344 is maintained.

The volumetric flow rate of the suctioning is sufficient to pull part 310 towards part 308 to maintain clamp-up 341. In particular, the volumetric flow rate is sufficient to provide a gripping force that grips wall 347 defining hole 345 to pull part 310 towards part 308. In other illustrative examples, wall 347 may also be referred to as a hole wall. This suctioning is sufficient to independently maintain clamp-up 341 of part 308 and part 310 relative to each other.

By using the suctioning to grip wall 347 that defines hole 345 in part 310, suction device 330 applies a suction force to part 310. This suction force pulls part 310 towards part 308 and ultimately, towards end effector 324. The positioning of nozzle 332 of end effector 324 relative to part 308 and with respect to the reference coordinate system creates a reactive force in response to the suction force. This reactive force is equal and opposite to the suction force.

Suctioning is performed until a desired force static equilibrium is reached between the suction force and the reactive force. Once the desired force static equilibrium is reached, suctioning can be used to independently maintain clamp-up 341 even when tool 336 is moved away from clamp-up 341.

In this manner, suction device 330 produces suction 349 sufficient to hold part 308 and part 310 in place relative to each other even after second force 344 has been removed (e.g., when tool 336 is moved away and end effector 326 is switched out for another end effector). In other words, when tool 336 is moved away and out of contact with part 310, such that second force 344 is removed, the suctioning of air through fastener hole 346 and into channel 334 of nozzle 332 maintains clamp-up 341 of part 308 and part 310.

In one or more illustrative examples, control system 315 is used to control the operation of end effector 324, end effector 326, and end effector 328. Control system 315 ensures that the desired force static equilibriums discussed above are established to thereby maintain clamp-up 341 and prevent any undesired shifting of part 308 relative to part 310 when end effector 326 for drilling is switched out with end effector 328 for fastener installation.

Specifically, end effector 326 with drilling tool 338 may be switched out with end effector 328 having fastener insertion tool 340. Fastener insertion tool 340 is used to insert fastener 348 within fastener hole 346 while suction device 330 continues to suction air through fastener hole 346 from the opposite side 311 of assembly 304. In this manner, assembly system 302 may allow installation of fastener 348 to be performed in a simple, easy, and efficient manner.

Suction device 330 provides a sufficient suction force that in combination with the reactive force provided by nozzle 332 maintains clamp-up 341 without requiring an additional force at side 312 of clamp-up 341. In other words, suction device 330 and nozzle 332 together ensure that clamp-up 341 is independently maintained from a single side of clamp-up 341.

Fastener 348 is installed while clamp-up 341 is maintained with suction 349. In these illustrative examples, suctioning continues until fastener 348 is fully installed within fastener hole 346. In some cases, fastener 348 is considered fully installed when a desired interference fit is formed between fastener 348 and fastener hole 346. In other examples, fastener 348 is considered fully installed only after fastener 348 has been inserted within fastener hole 346 and fastener retaining hardware has been installed over fastener 348. Fastener retaining hardware may include, for example, a collar, a nut, some other type of hardware, or a combination thereof. In other examples, fastener 348 may be considered fully installed after one or more other operations have been performed.

Once fastener 348 has been fully installed, suction 349 is no longer needed to maintain clamp-up. In other words, fastener 348 is used to maintain clamp-up 341 after suctioning has been stopped.

The illustration of manufacturing environment 100 in FIG. 1 is not meant to imply physical or architectural limitations to the manner in which an example embodiment may be implemented. Other components in addition to or in place of the ones illustrated may be used. Some components may be optional. Further, the blocks are presented to illustrate functional components. One or more of these blocks may be combined, divided, or combined and divided into different blocks when implemented in an example embodiment.

For example, in some cases, the drilling of fastener hole 346 may be part of a different process prior to part 308 and part 310 being brought together to form clamp-up 341. For example, first hole 343 may be drilled into part 308 and hole 345 may be drilled into part 310 prior to these parts being clamped-up.

Part 308 and part 310 may then be positioned relative to each other. In these examples, part 308 and part 310 are positioned to align hole 343 and hole 345 at least one of concentrically or coaxially. Hole 343 and hole 345 may be sized such that when hole 343 and hole 345 are aligned together they form fastener hole 346. In other examples, hole 343 and hole 345 may be determinate assembly (DA) holes. When hole 343 and hole 345 are determinate assembly holes and aligned coaxially, they form an index hole (not shown). Part 308 and part 310 may be temporarily mated using, for example, a temporary fastener installed through the index hole. The index hole may also be referred to as a reference hole, a guide hole, a tooling hole, or a through-hole.

In one or more examples, after the coaxial alignment of hole 343 and hole 345, suction 349 is used to establish and maintain clamp-up 341 of part 308 and part 310. This suctioning is formed at side 311 such that clamp-up 341 is a single-sided clamp-up. In some cases, when a temporary fastener is used to join part 308 and part 310, suction 349 is applied simultaneously with the removal of the temporary fastener to thereby establish and maintain clamp-up 341.

With reference to FIGS. 4-15, illustrations of an assembly system for performing a fastener installation operation are depicted in accordance with an example embodiment. In some illustrative examples, the assembly system may be referred to as a fastener installation system.

Figure 4:
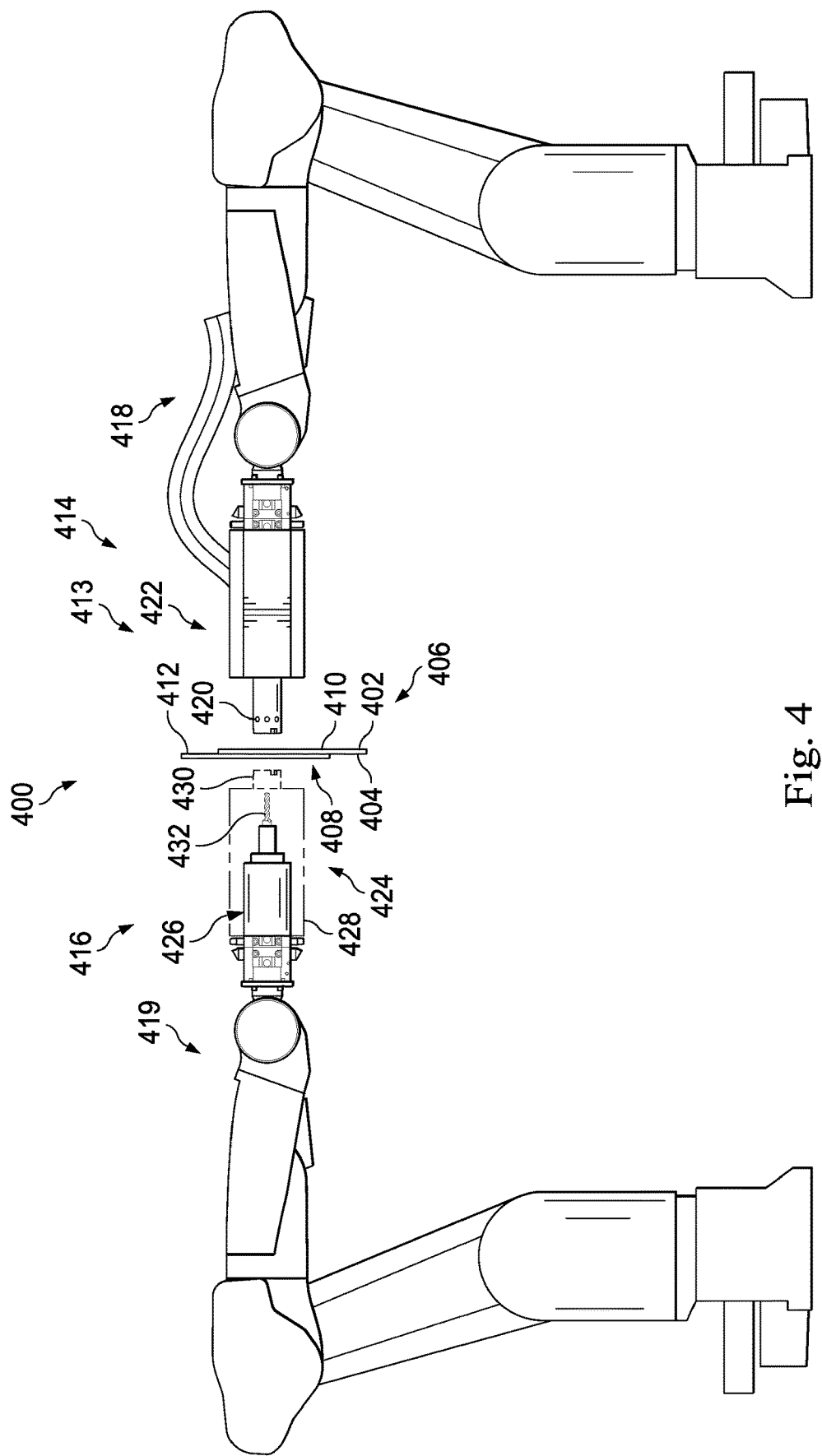
FIG. 4 is an illustration of a side view of robotic devices with single function end effectors positioned relative to an assembly in accordance with an example embodiment.

FIG. 4 is an illustration of an end view of single function end effectors positioned relative to a lap splice in accordance with an example embodiment. Lap splice 400 is an example of one implementation for assembly 304 in FIG. 3 or a panel joint in assembly 304. In addition to lap splice 400, the example embodiments may be also applicable to other types of splices not shown.

Lap splice 400 includes first part 402 and second part 404, which may be examples of implementations for part 308 and part 310 of FIG. 3, respectively. In other examples, lap splice 400 may include a third part (not shown) or some other number of parts. In one illustrative example, first part 402 and second part 404 take the form of fuselage panels. The size and scale of first part 402 and second part 404 in FIGS. 4-15 is shown for illustrative purposes only. In other illustrative examples, the size of first part 402 and second part 404 may be smaller than or much larger than shown in FIGS. 4-15.

Lap splice 400 has first side 406 and second side 408. In this illustrative example, first side 406 is formed by surface 410 of first part 402 and second side 408 is formed by surface 412 of second part 404. When first part 402 and second part 404 take the form of fuselage panels of a fuselage assembly, surface 410 of first part 402 may be facing an interior of the fuselage assembly and surface 412 of second part 404 may be facing an exterior of the fuselage assembly (the head of the fastener will be installed on the exterior surface, 412 when process completed).

In this illustrative example, assembly system 413 is positioned relative to assembly 409. Assembly system 413 includes end effector 414, end effector 416, robotic device 418, and robotic device 419.

End effector 414 and end effector 416 are coupled to robotic device 418 and robotic device 419, respectively. End effector 414 and end effector 416 may be examples of implementations for end effector 324 and end effector 326 of FIG. 3, respectively. End effector 414 is positioned relative to first side 406 of lap splice 400 and end effector 416 is positioned relative to second side 408 of lap splice 400.

End effector 414 and end effector 416 may be single function end effectors. End effector 414 includes at least nozzle 420 and suction device 422, which are examples of implementations of nozzle 332 and suction device 330, respectively, from FIG. 3. End effector 416 includes tool 424 and drilling tool 426. Tool 424 is depicted as transparent in FIG. 4 for illustrative purposes only. Tool 424 and drilling tool 426 are examples of implementations of tool 336 and drilling tool 338, respectively, from FIG. 3.

In this illustrative example, tool 424 includes element 428 and element 430. Element 428 takes the form of, for example, without limitation, a first cylindrical member that surrounds drilling tool 426. Element 430 takes the form of, for example, without limitation, a second cylindrical member having a smaller diameter than the first cylindrical member but sufficiently large to allow drill bit 432 of drilling tool 426 to pass through the second cylindrical member. In some illustrative examples, element 430 is sufficiently large to allow drill shavings or chips to be collected during drilling.

Figure 5:
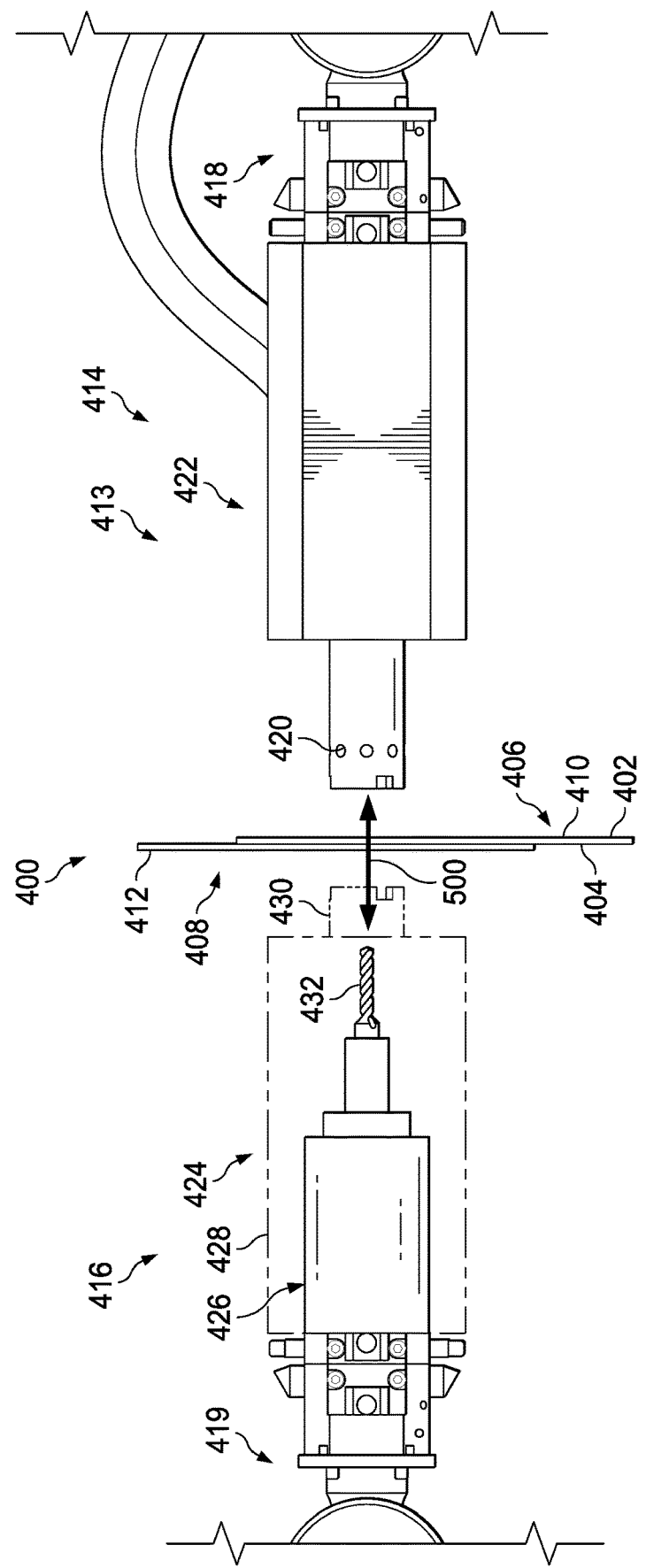
FIG. 5 is an illustration of an enlarged side view of end effectors from FIG. 4 positioned relative to the lap splice from FIG. 4 in accordance with an example embodiment.

FIG. 5 is an illustration of an enlarged side view of end effector 414 and end effector 416 positioned relative to lap splice 400 in accordance with an example embodiment. In this illustrative example, end effector 414 and end effector 416 have been positioned in alignment with reference axis 500 through lap splice 400. Reference axis 500 may be an axis substantially perpendicular to lap splice 400 that passes through lap splice 400 at the location at which a hole is to be drilled and a fastener is to be installed.

Figure 6:
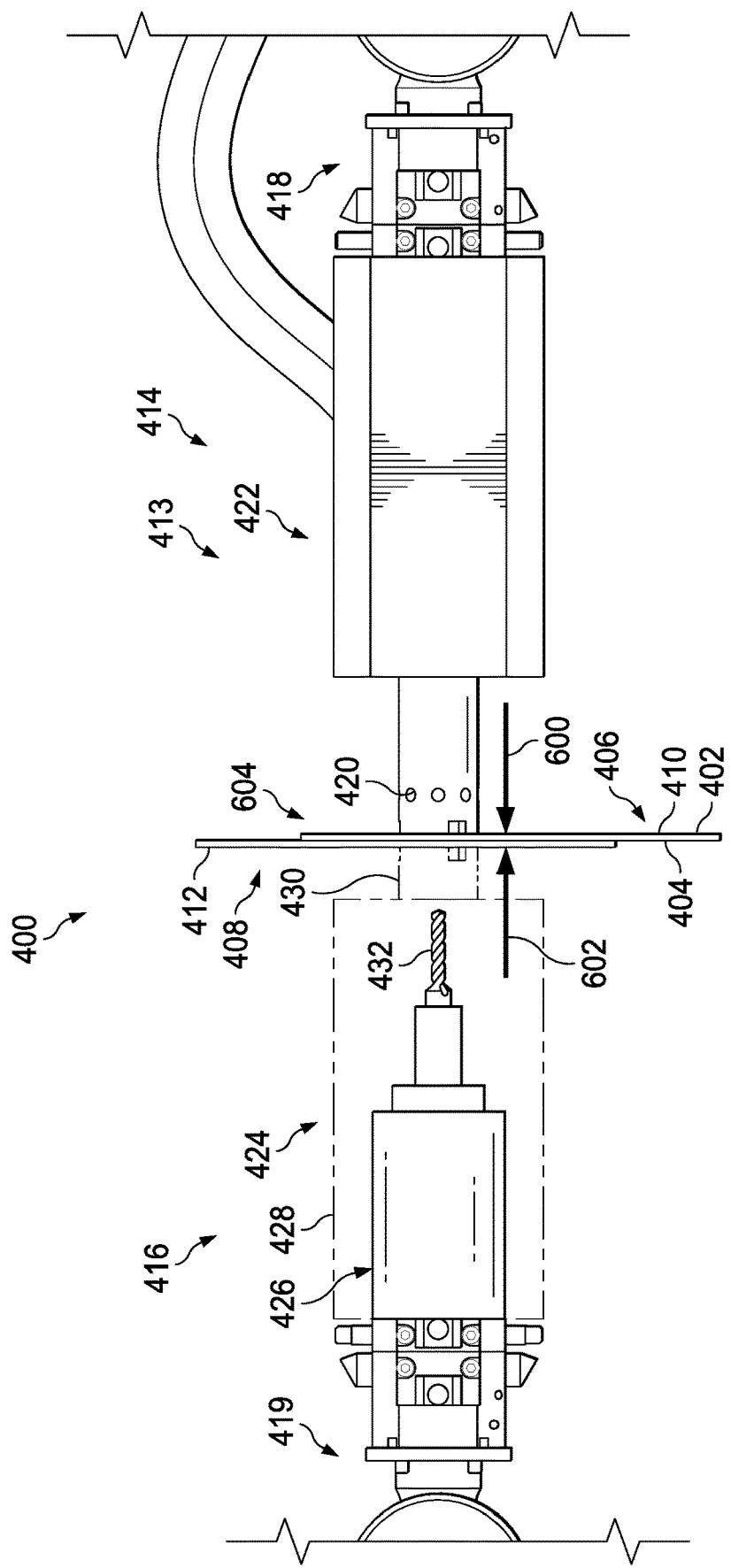
FIG. 6 is an illustration of a side view of the end effectors from FIG. 4 applying forces to the lap splice from FIG. 4 in accordance with an example embodiment.

FIG. 6 is an illustration of a side view of end effector 414 and end effector 416 applying forces to lap splice 400 in accordance with an example embodiment. As depicted, at least one of end effector 414 or robotic device 418 has been used to move nozzle 420 into contact with first side 406 of lap splice 400. Nozzle 420 is pushed against first side 406 to apply first force 600 to first side 406. First force 600 is an example of first force 342 in FIG. 3. First force 600 is a mechanical force.

Similarly, at least one of end effector 416 or robotic device 419 has been used to move element 430 into contact with second side 408 of lap splice 400. In particular, element 430 is pushed against second side 408 to apply second force 602 to second side 408.

Nozzle 420 and element 430 are pushed against first part 402 and second part 404, respectively, until a desired force static equilibrium is reached between first force 600 and second force 602 applied to lap splice 400. Once this desired force static equilibrium has been reached, clamp-up 604 of first part 402 and second part 404 is achieved. In other words, first part 402 and second part 404 may be held in place such that each of these parts is held in a particular position relative to the other.

While nozzle 420 and element 430 are no longer pushed against first part 402 and second part 404, respectively, they are kept fixed in the positions at which the desired force static equilibrium is achieved to maintain clamp-up 604. In some cases, sealant may be present in between first part 402 and second part 404.

Figure 7:
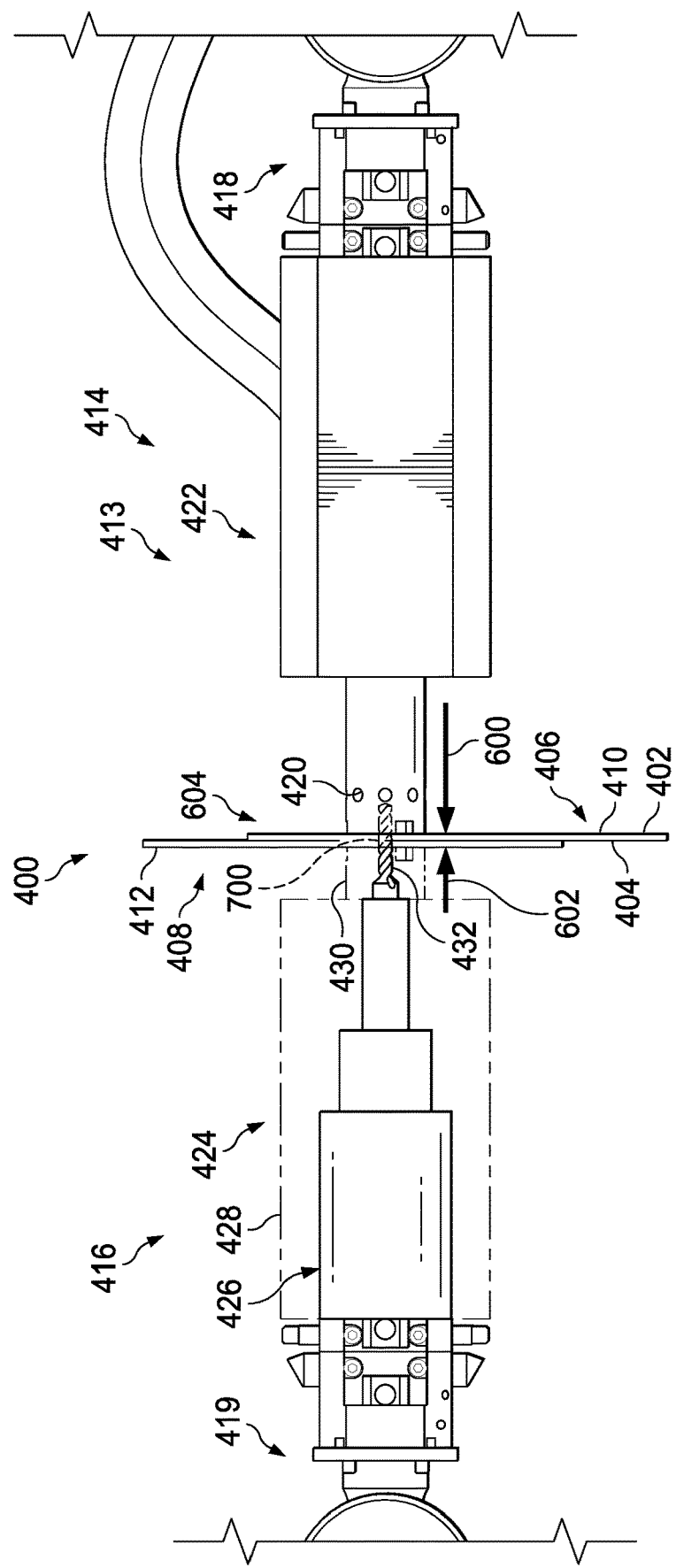
FIG. 7 is an illustration of a side view of a drilling operation in accordance with an example embodiment.

FIG. 7 is an illustration of a side view of a drilling operation in accordance with an example embodiment. Once clamp-up 604 of first part 402 and second part 404 has been established, drilling tool 426 of end effector 416 is operated to drill fastener hole 700 that extends through lap splice 400. Fastener hole 700 may extend from second side 408 of second part 404 all the way through to first side 406 of first part 402. In some cases, fastener hole 700 may be countersunk. Fastener 700 is an example of one implementation for fastener hole 346 in FIG. 3.

Figure 8:
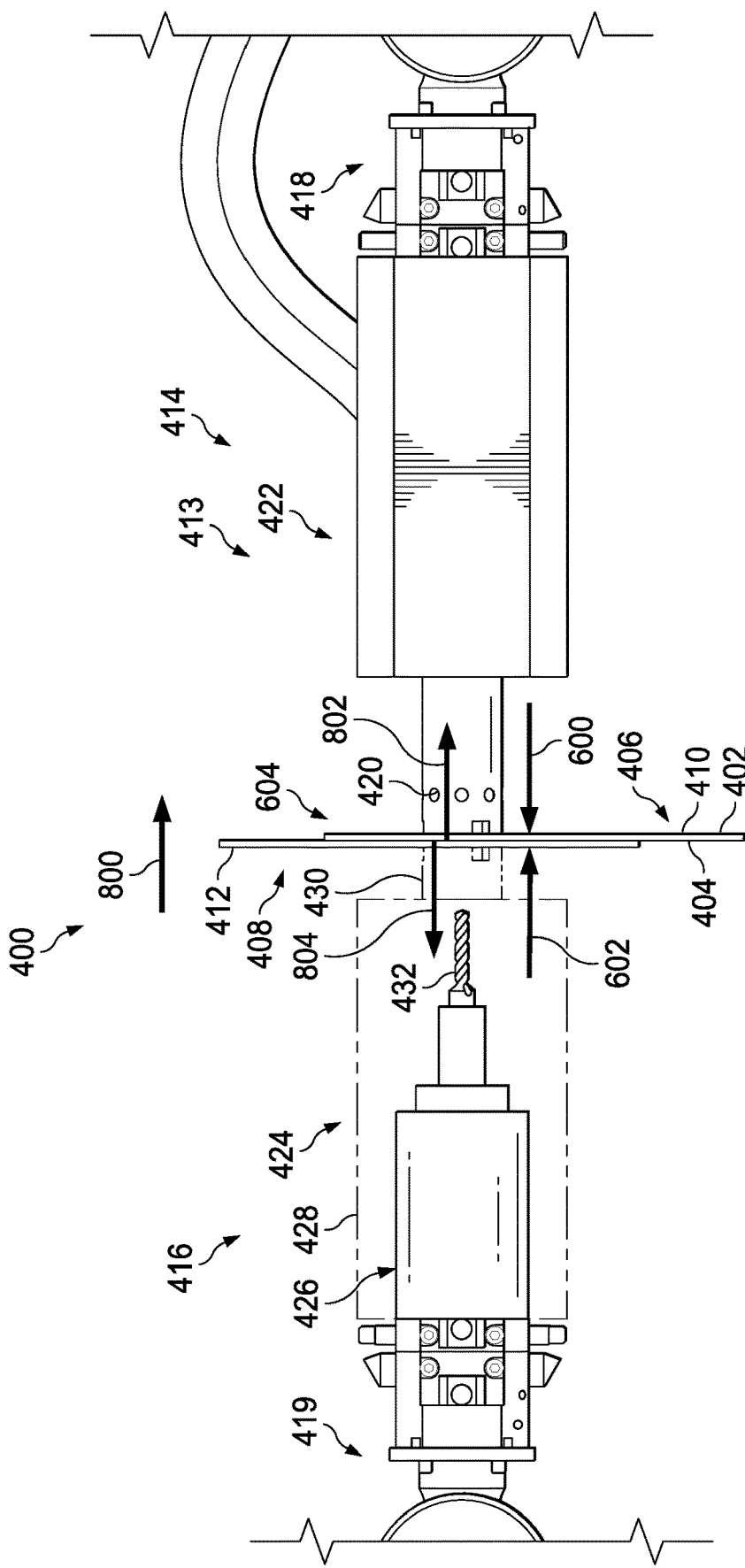
FIG. 8 is an illustration of a side view of a suctioning operation in accordance with an example embodiment.

FIG. 8 is an illustration of a side view of a suctioning operation in accordance with an example embodiment. After fastener hole 700 has been drilled, drill bit 432 is moved away from second part 404. For example, drill bit 432 may be retracted within element 428.

Suction device 422 of end effector 414 is operated to suction air through fastener hole 700 from first side 406 of lap splice 400. Air is suctioned through fastener hole 700 in the direction of arrow 800 from second side 408 of lap splice 400 towards first side 406 of lap splice 400. The air is suctioned through fastener hole 700 and into nozzle 420.

This suctioning creates a force, which may be suction force 802, that is applied to second part 404. Suction force 802 pulls second part 404 towards first part 402. Reactive force 804 is created in response to suction force 802 by the positioning of nozzle 420 in contact with first part 402. Suctioning is performed until the desired force static equilibrium is achieved between suction force 802 and reactive force 804. For example, suction power may be increased until the desired force static equilibrium is achieved and sufficient suction power has been generated to allow clamp-up 604 to be maintained via suction independently of first force 600 and second force 602.

In these illustrative examples, suction device 422 may be operated to continue to suction air through fastener hole 700 until the fastener installation operation has been completed. In some examples, each of element 430 and nozzle 420, or both, may have at least one of a notch, a groove, a port, an opening, or some other type of vent for allowing air to pass in and out. This venting helps ensure that the suction power is not greater than desired. For example, element 430 may have one or more notches along the edge of element 430 that comes into contact with second part 404 to help make moving element 430 away from second part 404 while suctioning is ongoing easier.

Figure 9:
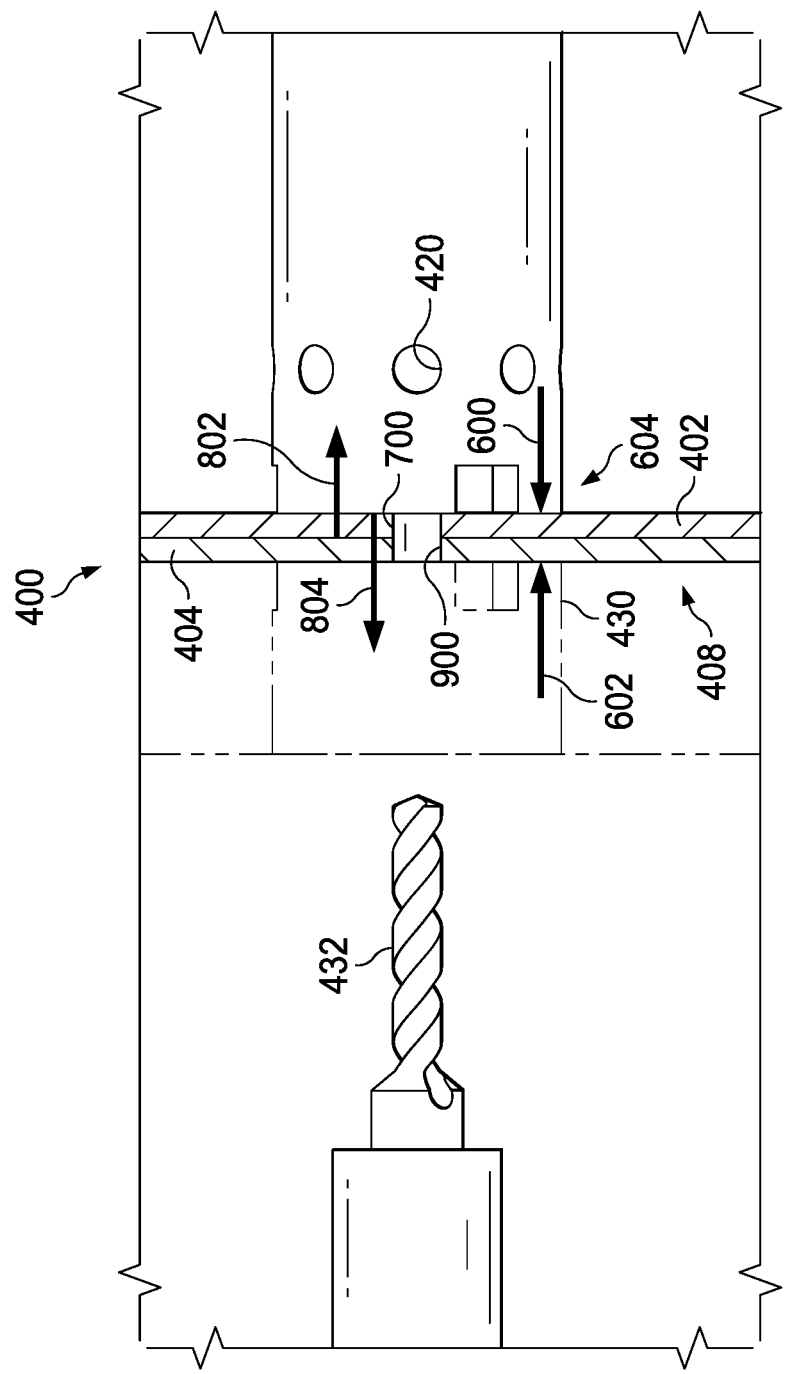
FIG. 9 is an illustration of an enlarged cross-sectional side view of the parts from FIG. 8 in accordance with an example embodiment.

FIG. 9 is an illustration of an enlarged cross-sectional side view of first part 402 and second part 404 in accordance with an example embodiment. This view allows fastener hole 700 and wall 900 that defines the portion of fastener hole 700 formed within second part 404 to be more clearly seen. Wall 900 may also be referred to as a hole wall.

As depicted, suction force 802 may be a gripping force that grips wall 900 defining the portion of fastener hole 700 formed within second part 404 to thereby pull second part 404 towards first part 402, and ultimately, towards nozzle 420. Nozzle 420 applies reactive force 804 on first part 402.

Together, suction force 802 and reactive force 804 may be used to independently maintain clamp-up 604 even after element 430 is moved away and out of contact with second part 404. By allowing clamp-up 604 to be maintained independently of first force 600 and second force 602, end effector 416 may be switched out with a different end effector. For example, at least one of end effector 416 or robotic device 419 may be operated to move element 430 of tool 424 away from lap splice 400. Robotic device 419 may then be switched out with a different robotic device and a different effector may be positioned relative to lap splice 400.

Figure 10:
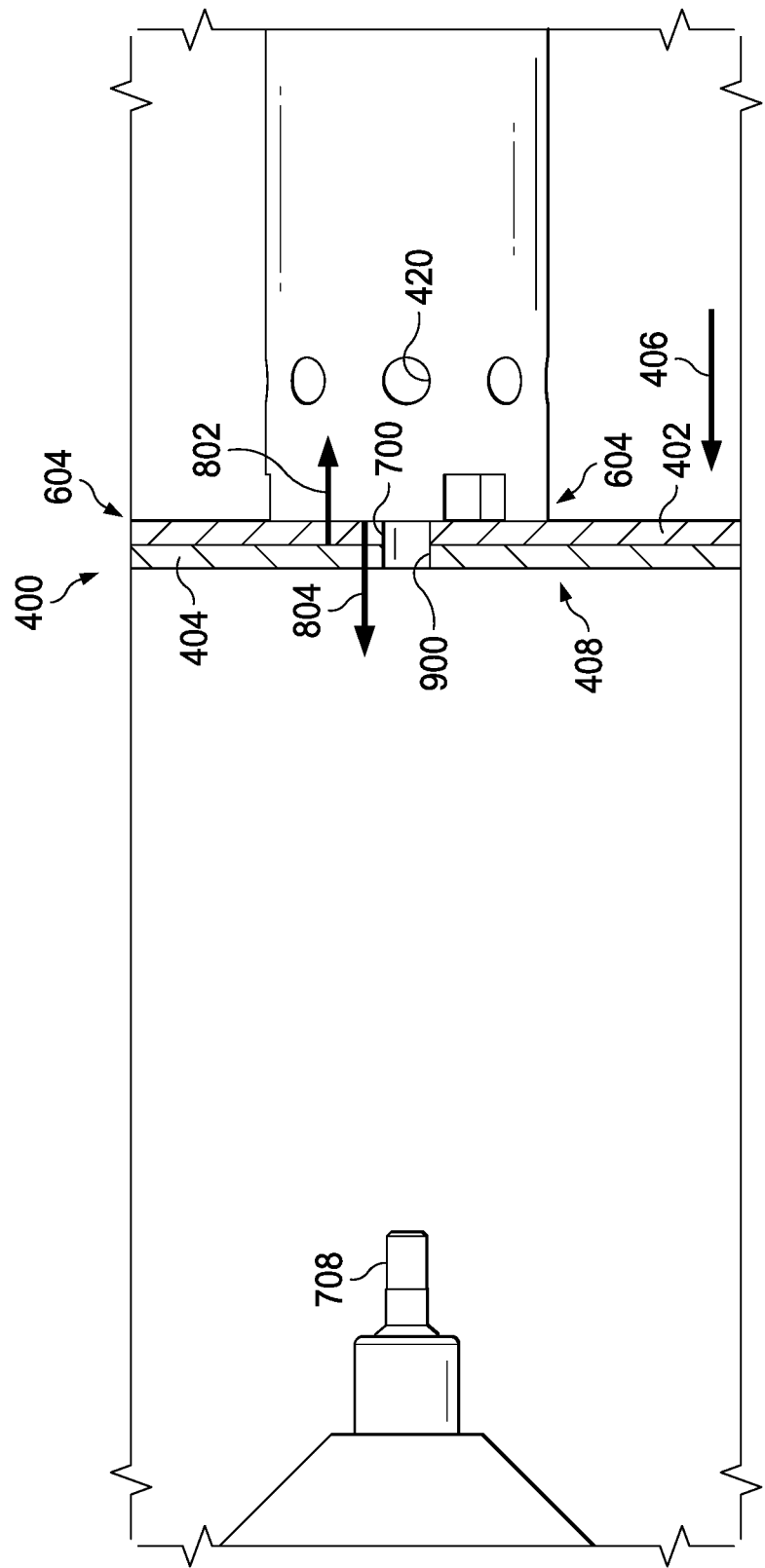
FIG. 10 is an illustration of an enlarged side view of a single-sided clamp-up in accordance with an example embodiment.

FIG. 10 is an illustration of an enlarged side view of a single-sided clamp-up in accordance with an example embodiment. As depicted, element 430 shown in the previous figures has been moved out of contact with first part 402. But even without first force 600 and second force 602, suction force 802 and reactive force 804 are able to independently maintain clamp-up.

Thus, single-sided clamp up is achieved. This type of single-sided clamp-up at first side 406 of lap splice 400 frees up the space around fastener hole 700 at second side 408 of lap splice 400 to allow for simpler and easier switching out of end effectors. No specialized tools are needed at second side 408 of lap splice 400 to maintain clamp-up 604.

Figure 11:
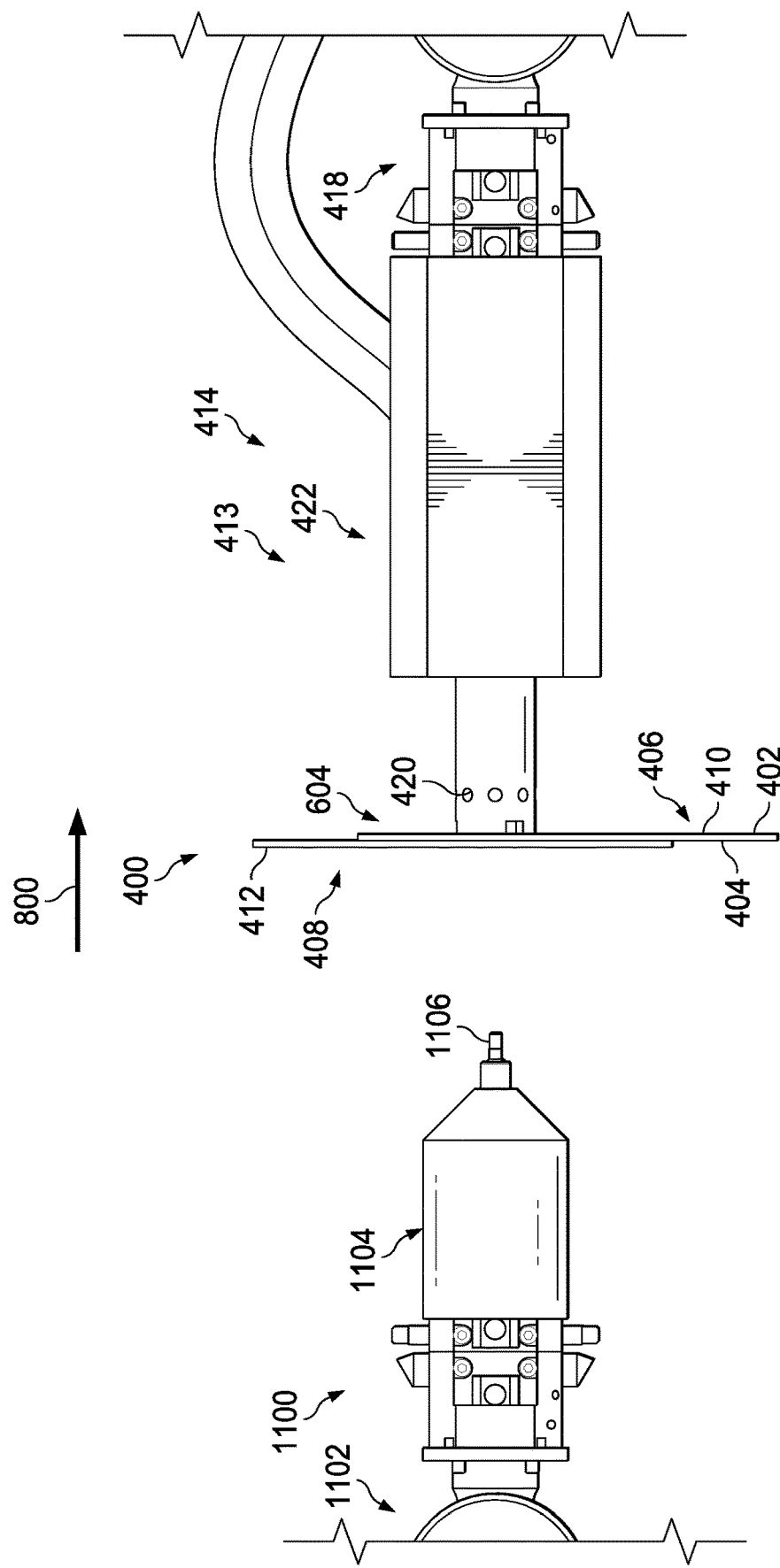
FIG. 11 is an illustration of another side view of the single-sided clamp-up from FIG. 10 in accordance with an example embodiment.

FIG. 11 is an illustration of another side view of the single-sided clamp-up from FIG. 10 in accordance with an example embodiment. As depicted, end effector 416 from FIGS. 4-9 has been switched out with end effector 1100, which is coupled to robotic device 1102. End effector 1100 and robotic device 1102 are part of assembly system 413.

In this illustrative example, robotic device 419 with end effector 416 is moved to allow robotic device 1102 with end effector 1100 to be positioned relative to second side 408 of lap splice 400. In other illustrative examples, end effector 416 may be swapped with end effector 1100 and end effector 1100 then coupled to robotic device 419. As depicted, the switching of end effectors occurs after fastener hole 700 has been drilled through lap splice 400 and single-sided clamp-up has been achieved.

In this illustrative example, end effector 1100 includes fastener insertion tool 1104. At least one of end effector 1100 or robotic device 1102 may be used to move and position fastener insertion tool 1104 relative to fastener hole 700 that has been drilled through lap splice 400. Fastener insertion tool 1104 is used to insert fastener 1106 into fastener hole 700. In one or more examples, fastener insertion tool 1104 installs fastener 1106 by forming a desired interference fit between fastener 1106 and fastener hole 700.

Figure 12:
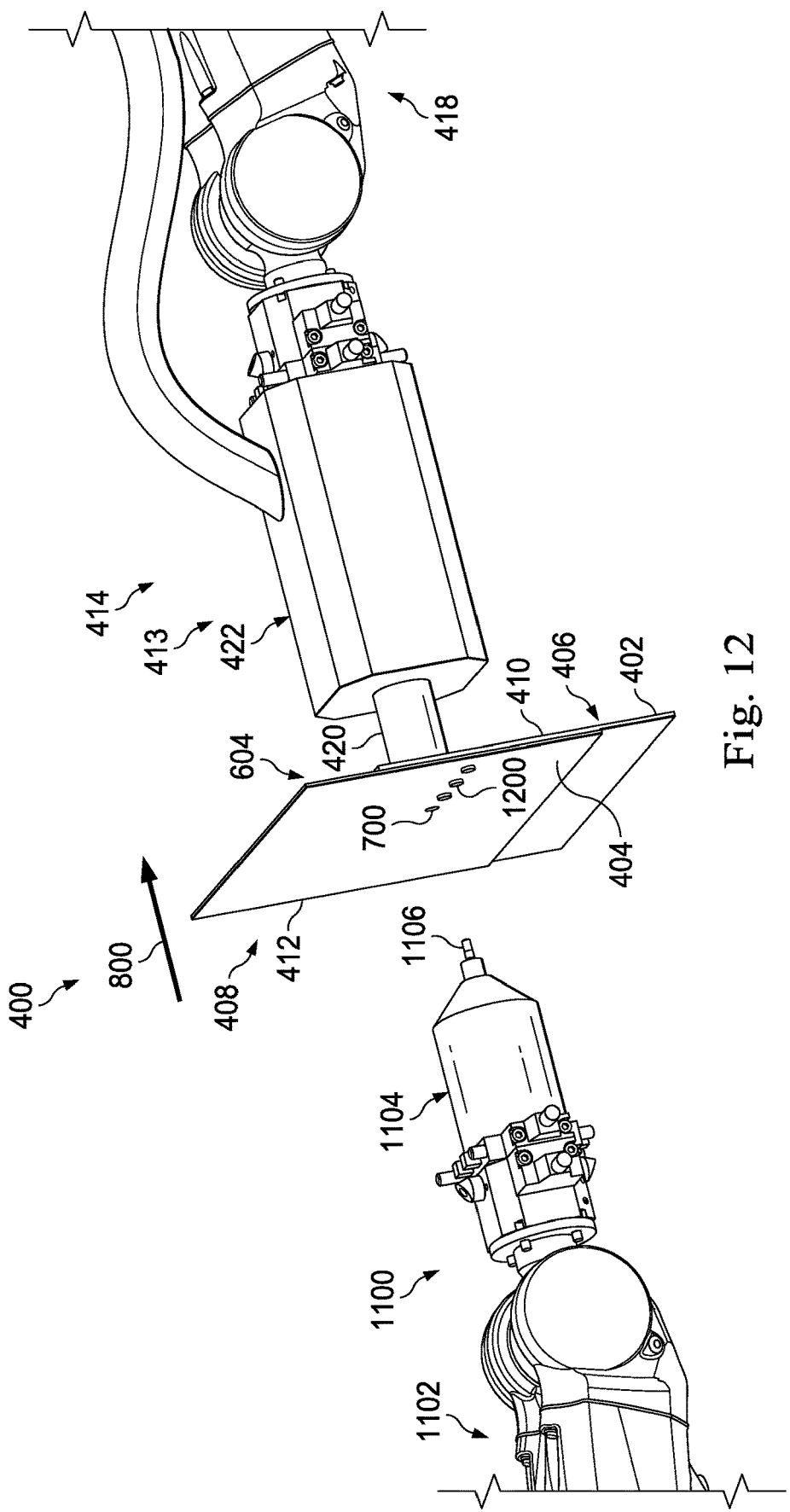
FIG. 12 is an illustration of a perspective view of an end effector positioned relative to a second side of the lap splice from FIG. 11 in accordance with an example embodiment.

FIG. 12 is an illustration of a perspective view of end effector 1100 positioned relative to second side 408 of lap splice 400 in accordance with an example embodiment. As depicted, fastener hole 700 is one of a plurality of fastener holes through lap splice 400 in which fasteners 1200 have been installed.

Figure 13:
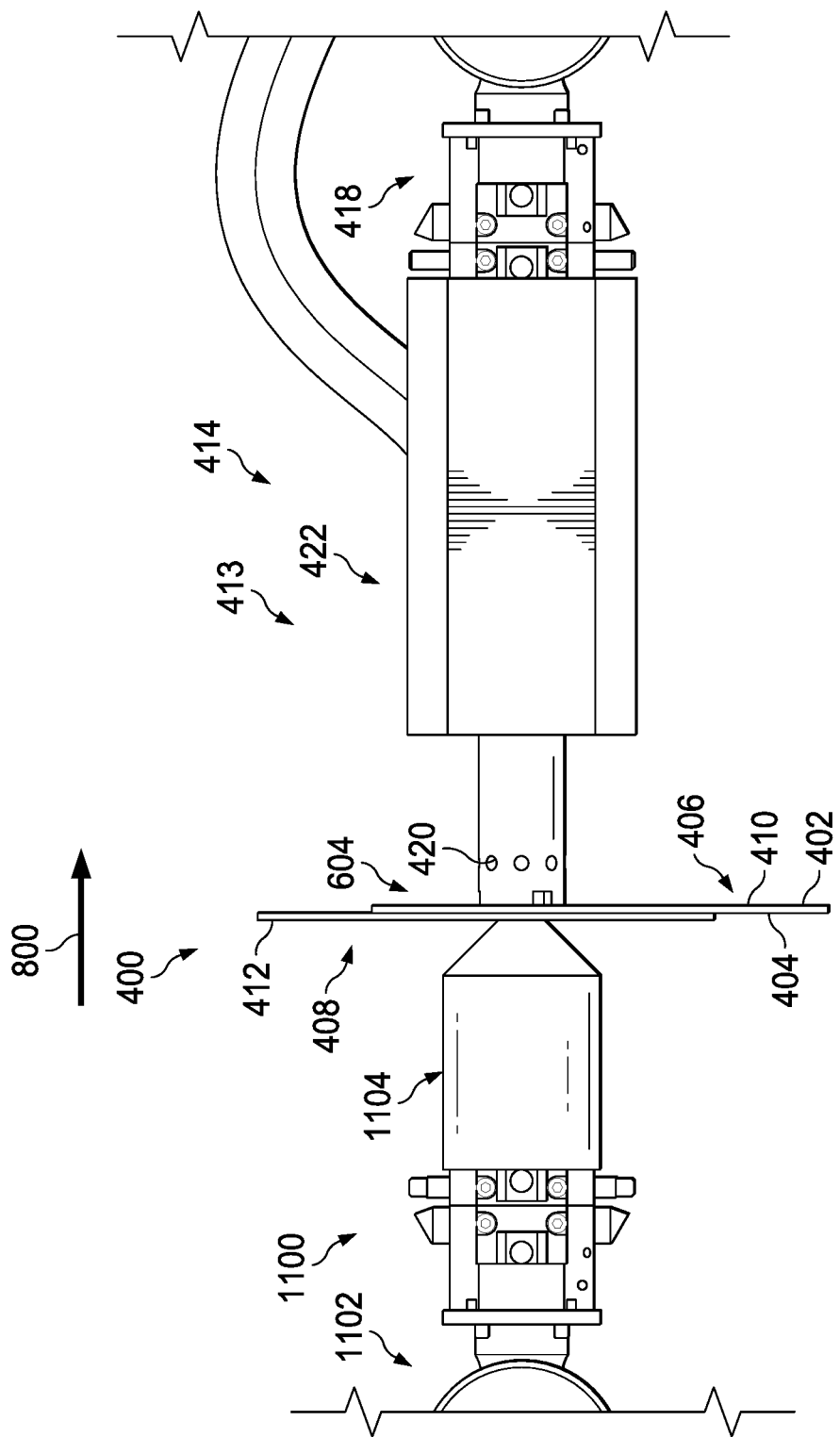
FIG. 13 is an illustration of a side view of a fastener insertion tool being used to insert the fastener (shown in FIGS. 11 and 12) into the fastener hole (shown in FIG. 11) in accordance with an example embodiment.

FIG. 13 is an illustration of a side view of fastener insertion tool 1104 being used to insert fastener 1106 (shown in FIGS. 11 and 12) into fastener hole 700 (shown in FIG. 11) in accordance with an example embodiment. Fastener insertion tool 1104 inserts fastener 1106 into fastener hole 700 while suction device 422 continues to suction air through fastener hole 700.

Figure 14:
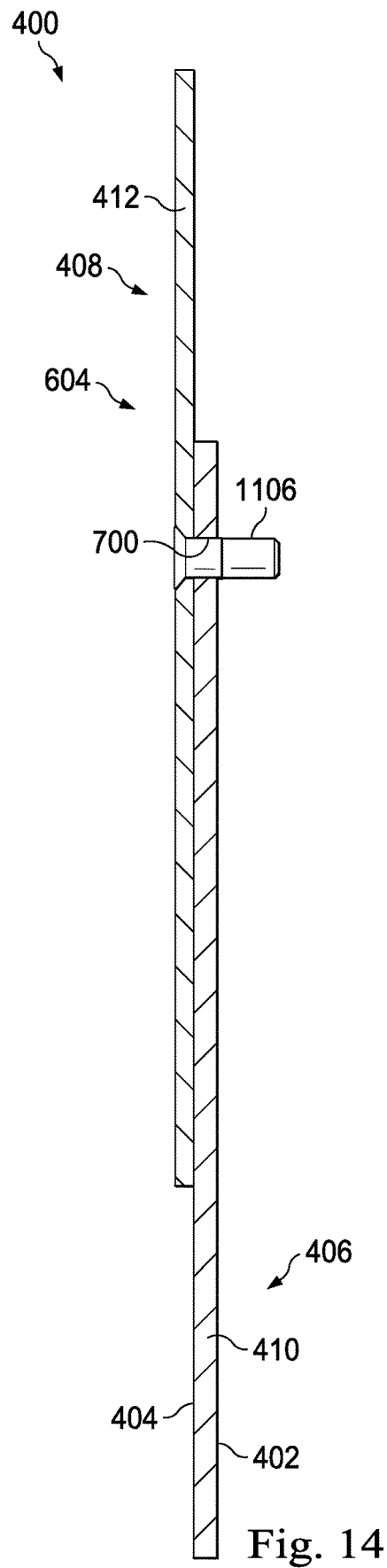
FIG. 14 is an illustration of a cross-sectional view of the installed fastener in the lap splice in accordance with an example embodiment.

FIG. 14 is an illustration of a cross-sectional view of the installed fastener 1106 in lap splice 400 in accordance with an example embodiment. In this particular illustrative example, fastener 1106 is a countersunk fastener and fastener hole 700 is a countersunk hole.

Figure 15:
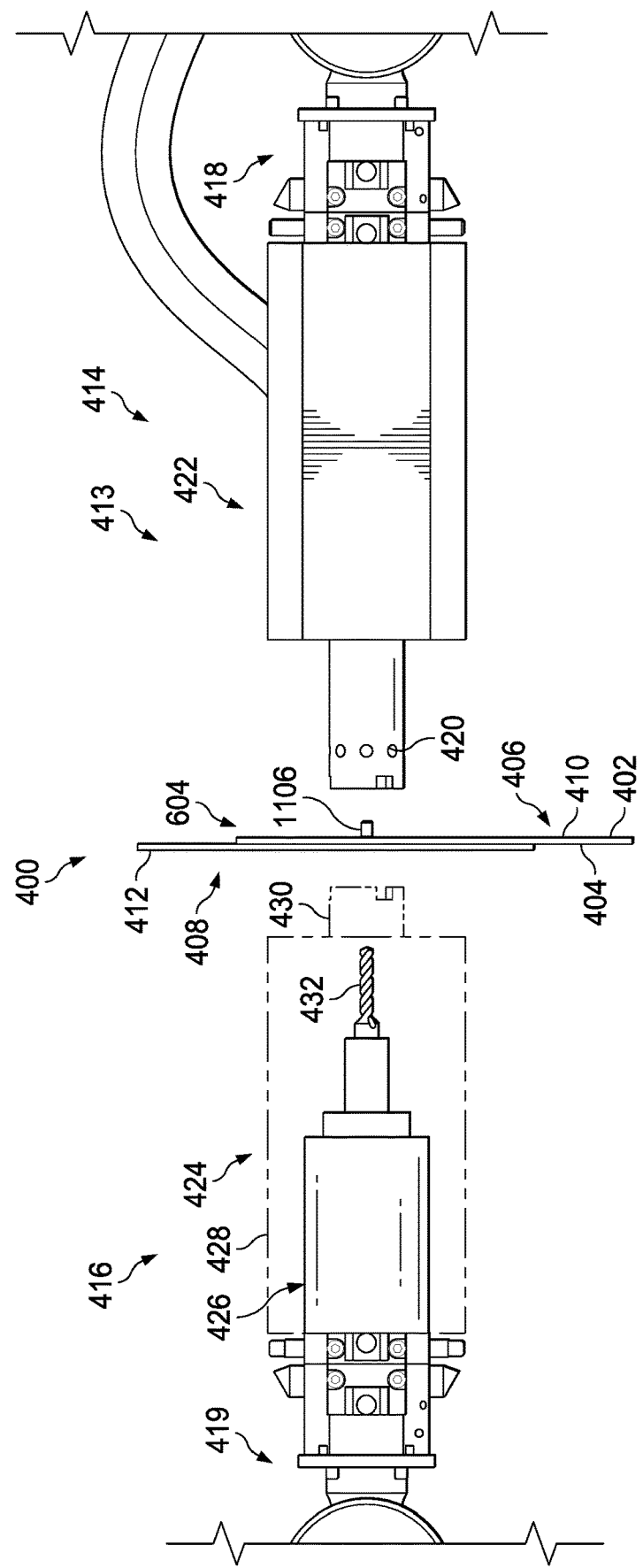
FIG. 15 is an illustration of a completion of the fastener installation operation in accordance with an example embodiment.

FIG. 15 is an illustration of a completion of the fastener installation operation in accordance with an example embodiment. As depicted, fastener 1106 has been installed in lap splice 400. Once fastener 1106 has been installed, suctioning is no longer needed to maintain clamp-up 504 from the previous figures. Fastener 1106 is capable of independently maintaining clamp-up 604 with respect to the portion of lap splice 400 in which fastener 1106 is installed.

In one or more illustrative examples, installation of fastener 1106 is completed once a desired interference fit has been formed between fastener 1106 and fastener hole 700. Once this interference fit has been formed, suctioning is discontinued. In other illustrative examples, fastener 1106 is considered fully installed when fastener retaining hardware is installed over fastener 1106. Suctioning continues until all the operations required to complete installation of fastener 1106 have been completed to ensure that the fastener installation meets requirements.

After fastener 1106 is fully installed, end effector 414 may be moved away from lap splice 400 and repositioned relative to a next location on lap splice 400 at which a fastener is to be installed. Further, end effector 1100 from FIGS. 11-13 may be switched out with end effector 416 and end effector 416 may be repositioned relative to the next location on lap splice 400 at which the new fastener is to be installed.

The illustrations of end effectors, tools, devices, and other components in FIGS. 4-15 are not meant to imply physical or architectural limitations to the manner in which an example embodiment may be implemented. Other components in addition to or in place of the ones illustrated may be used. Some components may be optional. The different components shown in FIGS. 4-15 may be illustrative examples of how components shown in block form in FIG. 3 can be implemented as physical structures. Additionally, some of the components in FIGS. 4-15 may be combined with components in FIG. 3, used with components in FIG. 3, or a combination of the two.

Figure 16:
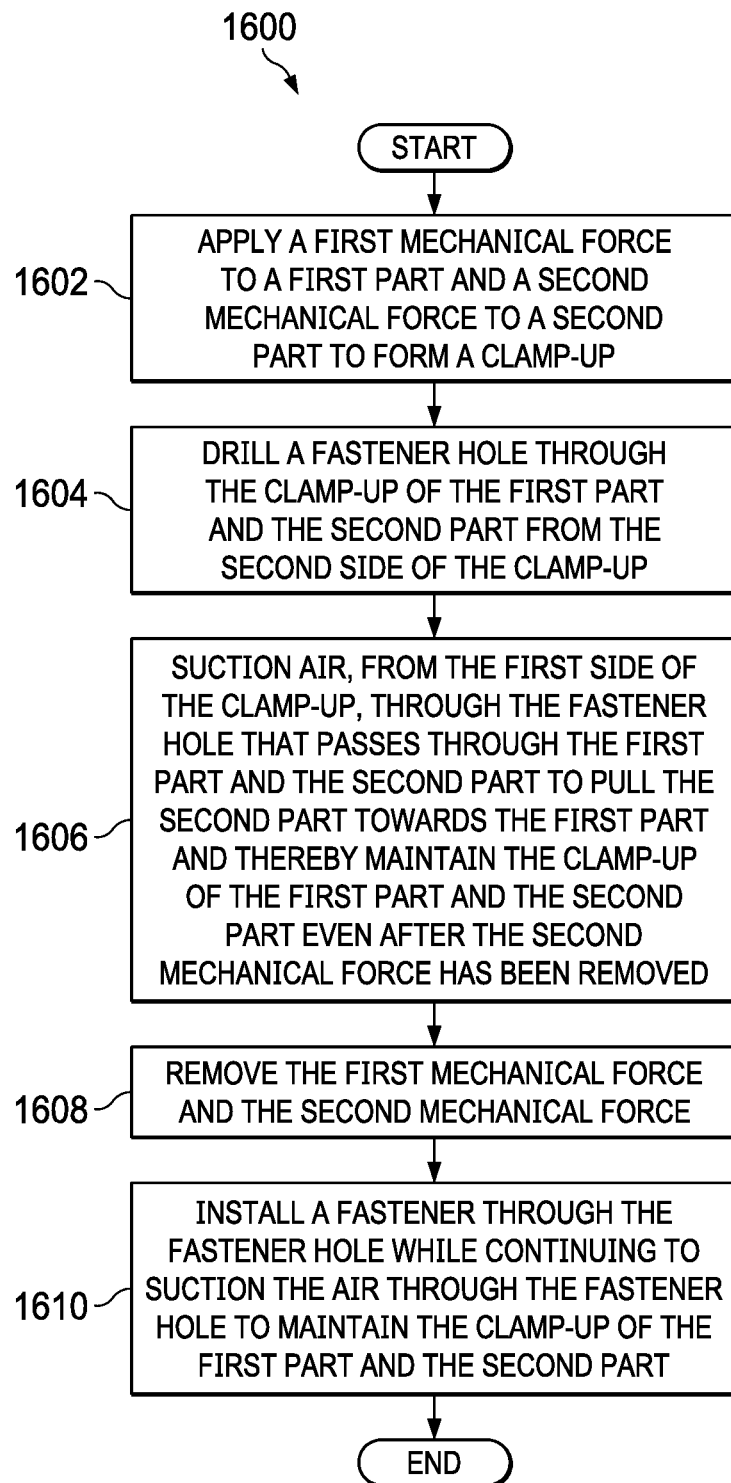
FIG. 16 is a flowchart of a method for performing a fastener installation in accordance with an example embodiment.

FIG. 16 is a flowchart of a method for performing a fastener installation in accordance with an example embodiment. Process 1600 illustrated in FIG. 16 may be implemented using assembly system 302 from FIG. 3 or assembly system 413 from FIGS. 4-15.

The process may begin by applying a first mechanical force to a first part and a second mechanical force to a second part to form a clamp-up of the first part and the second part (operation 1602). The assembly includes a first part and a second part positioned in contact with each other. The first part forms the first side of the clamp-up and the second part forms the second side of the clamp-up.

Optionally, a fastener hole is drilled through the clamp-up of the first part and the second part from the second side of the clamp-up (operation 1604). The fastener hole extends from the second side to the first side of the assembly. The fastener hole may be formed by a first hole drilled through the first part and a second hole drilled through the second part. In these illustrative examples, the first hole and the second hole are coaxial.

Air is suctioned, from the first side of the clamp-up, through the fastener hole that passes through the first part and the second part to pull the second part towards the first part and thereby maintain the clamp-up of the first part and the second part even after the second mechanical force has been removed (operation 1606). In other words, the suctioning of the air through the fastener hole maintains the "clamp-up" of the first part and the second part without requiring use of the second mechanical force at the second side of the clamp-up.

In particular, in operation 1606, suctioning is performed at a volumetric flow rate sufficient to maintain the clamp-up from just the first side of the clamp-up without requiring use of additional force at the second side of the clamp-up. Air is suctioned through the fastener hole to grip a wall of the second hole in the second part and thereby pull the second part towards the first part.

In these examples, air is suctioned from the first side of the clamp-up through the fastener hole in a direction towards the first part and at a volumetric flow rate sufficient to maintain a gripping of the wall of the second hole while overcoming a volume of suction lost at the second side of the clamp-up. For example, some volume of suction or suction force may be lost due to an open end of the fastener hole at the second side.

In some examples, depending on the implementation, operation 1606 may be begun after operation 1604 has been completed or during operation 1604. In other words, suctioning may be performed only after the fastener hole has been drilled or while the fastener hole is being drilled.

The first mechanical force and the second mechanical force are removed (operation 1608). Operation 1608 includes, for example, switching out the end effector that performed the drilling of operation 1604 with a new end effector. The suctioning performed in operation 1606 continues in order to maintain the clamp-up of the first part and the second part during the switching out of the end effectors.

Thereafter, a fastener is installed within the fastener hole while continuing to suction the air through the fastener hole to maintain the clamp-up of the first part and the second part (operation 1610). In one or more illustrative examples, operation 1610 includes inserting the fastener into the fastener hole and forming a desired interference fit. In other illustrative examples, operation 1610 includes inserting the fastener into the fastener hole and installing fastener retaining hardware around the elongate portion of the fastener extending through the fastener hole.

Continuing to perform the suctioning of air in operation 1606 while operation 1610 is performed ensures that the clamp-up of the first part and the second part is maintained throughout the insertion of the fastener. The suctioning of the air through the hole may be continued until the entire fastener installation operation is completed. For example, suctioning may be continued to maintain the clamp-up until a desired interference fit is formed between the fastener and the fastener hole.

Figure 17:
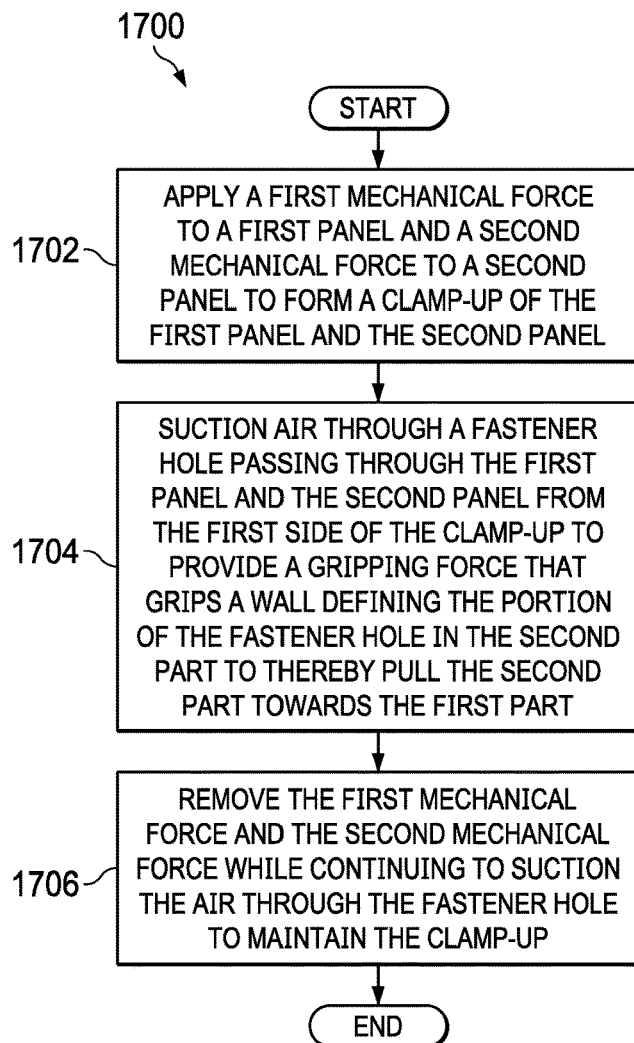
FIG. 17 is a flowchart of a process for maintaining a clamp-up in accordance with an example embodiment.

FIG. 17 is a flowchart of a process for maintaining a clamp-up in accordance with an example embodiment. Process 1700 illustrated in FIG. 17 may be performed using, for example, assembly system 302 from FIG. 3 or assembly system 413 from FIGS. 4-15.

Process 1700 may begin by applying a first mechanical force to a first panel and a second mechanical force to a second panel to form a clamp-up of the first panel and the second panel (operation 1702). The first panel and the second panel are fuselage panels.

Operation 1702 may be performed by applying the first force using a tool coupled to a first end effector, such as end effector 414 in FIG. 4. The tool may be, for example, a nozzle, such as nozzle 420 in FIG. 4. However, in other illustrative examples, the tool may be some other type of member, element, or structural component. The second force is applied using a tool coupled to a second end effector, such as end effector 416 in FIG. 4.

Air is suctioned through a fastener hole passing through the first panel and the second panel from the first side of the clamp-up to provide a gripping force that grips a wall defining the portion of the fastener hole in the second part to thereby pull the second part towards the first part (operation 1704). In operation 1704, a partial vacuum is drawn through the fastener hole and through the nozzle positioned relative to the first panel at the first side of the clamp-up to maintain the clamp-up.

In some illustrative examples, the fastener hole may be drilled as part of the process 1700. For example, the hole may be drilled between the performing of operations 1702 and 1704. In other illustrative examples, the drilling of the fastener hole is part of a different process or is performed prior to process 1700. For example, a first hole may be drilled into the first panel and a second hole may be drilled into the second panel prior to these panels being "clamped-up." The first panel and the second panel may then be positioned relative to each other such that the holes are aligned to form a single coaxial fastener hole prior to operation 1702. Afterwards, operation 1702 may be performed to initiate process 1700.

With reference again to operation 1704, the suctioning of the air is performed with sufficient suction power (e.g., a sufficient volumetric flow rate) to maintain the clamp-up of the first panel and the second panel without requiring the second mechanical force. The suctioning maintains the clamp-up when the gripping force provided by the suctioning is opposite and equal to the first mechanical force being applied. As the second panel is pulled towards the first panel, the first mechanical force causes the first panel to exert an equal reactive force on the second panel to thereby maintain the clamp-up.

Thereafter, the second mechanical force is removed while continuing to suction the air through the fastener to maintain the clamp-up (operation 1706). In some illustrative examples, process 1700 terminates. In other illustrative examples, process 1700 includes installing a fastener through the fastener hole from the second side of the clamp-up while continuing to suction the air through the fastener hole from the first side to maintain the clamp-up during fastener installation.

Figure 18:
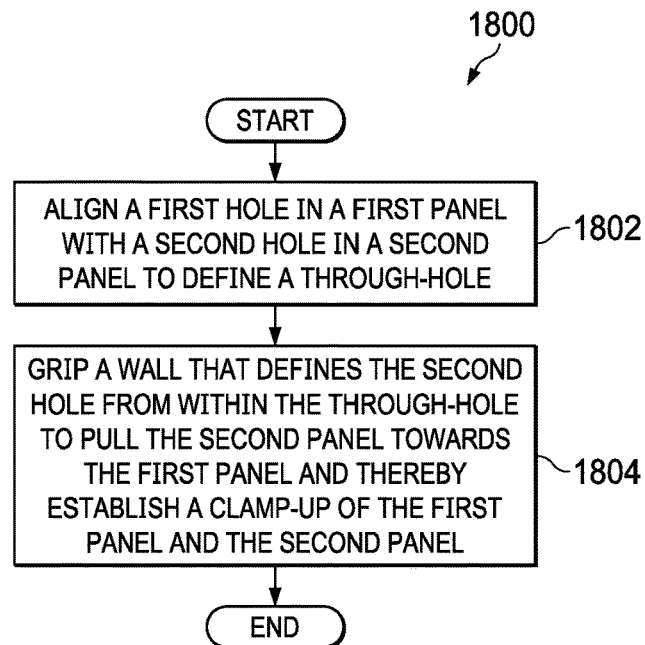
FIG. 18 is a flowchart of a process for maintaining a clamp-up in accordance with an example embodiment.

FIG. 18 is a flowchart of a process for establishing a clamp-up in accordance with an example embodiment. Process 1800 illustrated in FIG. 18 may be performed using, for example, assembly system 302 from FIG. 3 or assembly system 413 from FIGS. 4-15.

Process 1800 begins by aligning a first hole in a first panel with a second hole in a second panel to define a through-hole (operation 1802). In these illustrative examples, operation 1802 is performed to at least one of concentrically or coaxially align the first hole and the second hole to define the through-hole. As one illustrative example, the first panel and the second panel are positioned relative to each other to coaxially align the first hole with the second hole.

In some examples, the through-hole takes the form of a fastener hole, such as fastener hole 346 in FIG. 3. In other examples, the through-hole takes the form of an index hole. For example, the first hole and the second hole that are aligned in operation 1802 may be determinate assembly holes. The first and second holes may be coaxially aligned in operation 1802 to form an index hole. In one or more illustrative examples, the first panel and the second panel in operation 1802 may be fuselage panels, wing panels, or some other type of panels.

In still other illustrative examples, aligning the first hole in the first panel with the second hole in the second panel in operation 1802 comprises drilling the first hole in the first panel and drilling the second hole in the second panel in a manner that coaxially aligns these two holes and forms a through-hole through the first panel and the second panel.

Thereafter, a hole-wall that defines the second hole is gripped from within the through-hole to pull the second panel towards the first panel and thereby establish a clamp-up of the first panel and the second panel (operation 1804). The clamp-up established in operation 1804 is a single-sided clamp-up. Operation 1804 may be performed using, for example, suction to grip the wall of the second hole. Air is suctioned through the through-hole such that the suctioning force provides a gripping force to grip the wall of the second hole. In particular, a partial vacuum is drawn through the through-hole to thereby provide a gripping force that grips the wall of the second hole. The partial vacuum is created despite the outward-facing end of the second hole being an open end.

The clamp-up formed in operation 1804 may be maintained until one or more operations are performed with respect to the through-hole. For example, the clamp-up may be maintained until either a temporary fastener has been installed to maintain clamp-up or a drilling operation has been performed to enlarge the through-hole to form a fastener hole. In some cases, the clamp-up is maintained until a fastener installation operation has been performed to install a fastener within the through-hole, wherein the hole diameter is within tolerance for a fastener installation. In some cases, the clamp-up may be maintained until a drilling operation and a fastener installation operation have been performed. In still other examples, the clamp-up is maintained until a fastener installation operation has been performed that includes insertion of the fastener through the through-hole and the securing of a nut or collar onto the fastener.

The single-sided clamp-up allows various tools and devices to be moved around relative to the location of the through-hole from the opposite side from where the partial vacuum is being drawn. The single-sided clamp-up improves the efficiency of assembly processes.

FIG. 19 is a flowchart of a process for maintaining a single-sided clamp-up in accordance with an example embodiment. Process 1900 illustrated in FIG. 19 may be performed using, for example, assembly system 302 from FIG. 3 or assembly system 413 from FIGS. 4-15. In particular, process 1900 may be performed using end effector 324 in FIG. 3 or end effector 414 in FIGS. 4-15.

Process 1900 includes suctioning, from a first side of a clamp-up of a first part and a second part, air through a fastener hole formed by a first hole in the first part and a second hole in the second part to pull the second part towards the first part and thereby maintain the clamp-up of the first part and the second part (operation 1902). In one or more illustrative examples, operation 1902 includes suctioning, from the first side of the clamp-up, the air through the fastener hole to grip a wall that defines the second hole in the second part to thereby pull the second part towards the first part.

Optionally, process 1900 also includes removing the first mechanical force and second mechanical force after a force static equilibrium has been established by a suction force produced by the suctioning and a reactive force produced by a contact surface of a first tool at the first side of the clamp-up (operation 1904), with the process terminating thereafter. The first mechanical force may have been applied by the first tool at the first side of the clamp-up. The second mechanical force may have been applied by a second tool at a second side of the clamp-up during the suctioning.

The suction force and the reactive force maintain the clamp-up of the first part and the second part without the first mechanical force and the second mechanical force. In these illustrative examples, the first mechanical force and the second mechanical force are applied at least until the force static equilibrium is established by the suction force produced by the suctioning and the reactive force produced by the contact surface of the first tool at the first side of the clamp-up.

Optionally, process 1900 further includes installing a fastener through the fastener hole while continuing to suction the air through the fastener hole (operation 1906). In operation 1906, the suctioning may be performed at least until the fastener is fully installed.

FIG. 20 is a flowchart of a process for maintaining a single-sided clamp-up in accordance with an example embodiment. Process 2000 illustrated in FIG. 20 may be performed using, for example, assembly system 302 from FIG. 3 or assembly system 413 from FIGS. 4-15.

Process 2000 begins by applying a first mechanical force and a second mechanical force to a first part and a second part, respectively, to form the clamp-up (operation 2002). The first part forms a first side of the clamp-up and the second part forms a second side of the clamp-up. Next, air is suctioned, from the first side of the clamp-up, through a fastener hole that extends through the first part and the second part to pull the second part towards the first part (operation 2004). The first mechanical force and the second mechanical force are removed simultaneously while continuing to suction such that the suctioning independently maintains clamp-up after removal of the first mechanical force and the second mechanical force (operation 2006), with the process terminating thereafter.

FIG. 21 is a flowchart of a process for maintaining a single-sided clamp-up in accordance with an example embodiment. Process 2100 illustrated in FIG. 21 may be performed using, for example, assembly system 302 from FIG. 3 or assembly system 413 from FIGS. 4-15.

Process 2100 includes applying, by a first end effector at a first side of a panel joint, a first force via contact with the first side of a panel joint (operation 2102). Process 2100 includes applying, by a second end effector at a second side of the panel joint, a second force that is equal and opposite to the first force via contact with the second side of the panel joint to establish the clamp-up (operation 2104). Further, process 2100 includes maintaining, by the first end effector at the first side of the panel joint, the clamp-up after the second end effector is removed from contact with the second side (operation 2106), with the process terminating thereafter.

FIG. 22 is a flowchart of a process for maintaining a single-sided clamp-up in accordance with an example embodiment. Process 2200 illustrated in FIG. 22 may be performed using, for example, assembly system 302 from FIG. 3 or assembly system 413 from FIGS. 4-15.

Process 2200 includes applying, by a single function end effector positioned at a first side of a panel joint, a first force to a first panel of the panel joint (operation 2202). Process 2200 further includes applying, by the single function end effector, a second force that is equal and opposite to the first force to a second panel of the panel joint to thereby provide the single-sided clamp-up of the first panel and the second panel (operation 2204), with the process terminating thereafter.

In some illustrative examples, one or more operations may be performed prior to operation 2202. For example, in some cases, holes are created in the first panel and the second panel prior to operation 2202. These holes may be formed via drilling, punching through the panels, or by some other hole-making operation. These holes may be drilled while an initial clamp-up of the panels has been established such that holes are aligned at least one of concentrically or coaxially to form a through-hole (fastener hole). In other illustrative examples, determinate assembly holes may be formed in the panels individually and then the panels later brought together to align the holes.

FIG. 23 is a flowchart of a process for providing a single-sided clamp-up in accordance with an example embodiment. Process 2300 illustrated in FIG. 23 may be performed using a single function end effector, such as end effector 324 in FIG. 3 or end effector 414 described in FIGS. 4-15.

Process 2300 includes, optionally, aligning a first hole in a first part with a second hole in a second part at least one of concentrically or coaxially (operation 2302). In some examples, operation 2302 includes drilling through a clamp-up formed by the first part and the second part to form the first hole and the second hole that are at least one of concentrically or coaxially aligned. In one or more illustrative examples, operation 2302 includes simply aligning the first part already having the first hole with the second part already having the second hole (e.g. determinate assembly holes) to thereby align the first hole and the second hole.

Next, process 2300 includes reaching through the first hole in the first part to grip a wall that defines the second hole in the second part to thereby pull the second part against the first part (operation 2304), with the process terminating thereafter. In some examples, operation 2304 includes creating a pressure differential that acts on the wall of the second hole in the second part to pull the second part against the first part. In one or more examples, operation 2304 includes suctioning, by a suction device positioned relative to the first part, air through the first hole and the second hole to pull the second part towards the first part.

In this manner, process 2300 provides a method for establishing and maintaining a clamp-up. In particular, a single-sided clamp-up is provided.

Figure 24:
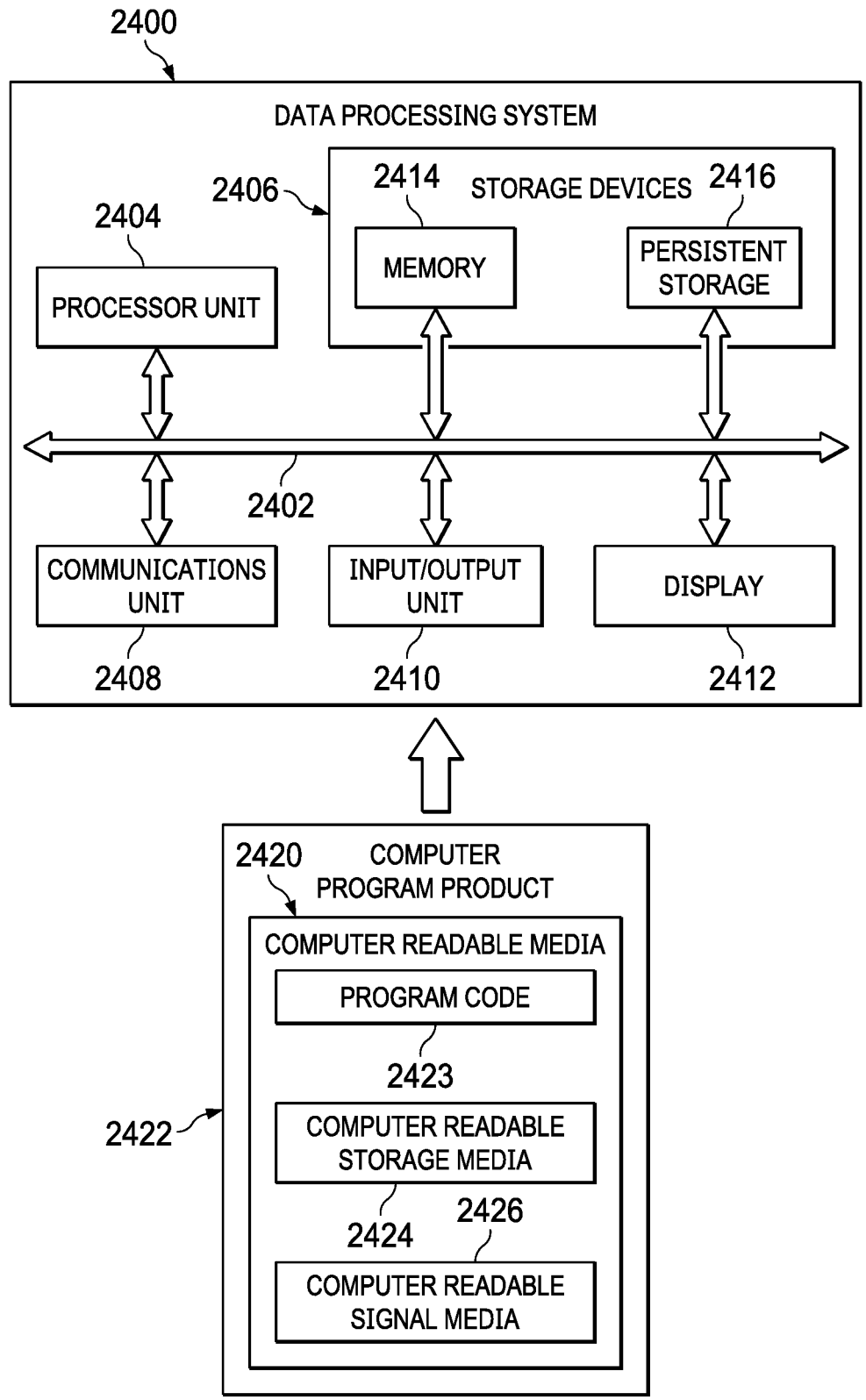
FIG. 24 is a block diagram of a data processing system in accordance with an example embodiment.

Turning now to FIG. 24, an illustration of a data processing system in the form of a block diagram is depicted in accordance with an example embodiment. Data processing system 2400 may be used to implement control system 315 in FIG. 3. As depicted, data processing system 2400 includes communications framework 2402, which provides communications between processor unit 2404, storage devices 2406, communications unit 2408, input/output unit 2410, and display 2412. In some cases, communications framework 2402 may be implemented as a bus system.

Processor unit 2404 is configured to execute instructions for software to perform a number of operations. Processor unit 2404 may comprise a number of processors, a multi-processor core, and/or some other type of processor, depending on the implementation. In some cases, processor unit 2404 may take the form of a hardware unit, such as a circuit system, an application specific integrated circuit (ASIC), a programmable logic device, or some other suitable type of hardware unit.

Instructions for the operating system, applications, and/or programs run by processor unit 2404 may be located in storage devices 2406. Storage devices 2406 may be in communication with processor unit 2404 through communications framework 2402. As used herein, a storage device, also referred to as a computer readable storage device, is any piece of hardware capable of storing information on a temporary and/or permanent basis. This information may include, but is not limited to, data, program code, and/or other information.

Memory 2414 and persistent storage 2416 are examples of storage devices 2406. Memory 2414 may take the form of, for example, a random-access memory or some type of volatile or non-volatile storage device. Persistent storage 2416 may comprise any number of components or devices. For example, persistent storage 2416 may comprise a hard drive, a flash memory, a rewritable optical disk, a rewritable magnetic tape, or some combination of the above. The media used by persistent storage 2416 may or may not be removable.

Communications unit 2408 allows data processing system 2400 to communicate with other data processing systems and/or devices. Communications unit 2408 may provide communications using physical and/or wireless communications links.

Input/output unit 2410 allows input to be received from and output to be sent to other devices connected to data processing system 2400. For example, input/output unit 2410 may allow user input to be received through a keyboard, a mouse, and/or some other type of input device. As another example, input/output unit 2410 may allow output to be sent to a printer connected to data processing system 2400.

Display 2412 is configured to display information to a user. Display 2412 may comprise, for example, without limitation, a monitor, a touch screen, a laser display, a holographic display, a virtual display device, and/or some other type of display device.

In this illustrative example, the processes of the different example embodiments may be performed by processor unit 2404 using computer-implemented instructions. These instructions may be referred to as program code, computer usable program code, or computer readable program code and may be read and executed by one or more processors in processor unit 2404.

In these examples, program code 2418 is located in a functional form on computer readable media 2420, which is selectively removable, and may be loaded onto or transferred to data processing system 2400 for execution by processor unit 2404. Program code 2418 and computer readable media 2420 together form computer program product 2422. In this illustrative example, computer readable media 2420 may be computer readable storage media 2424 or computer readable signal media 2426.

Computer readable storage media 2424 is a physical or tangible storage device used to store program code 2418 rather than a medium that propagates or transmits program code 2418. Computer readable storage media 2424 may be, for example, without limitation, an optical or magnetic disk or a persistent storage device that is connected to data processing system 2400.

Alternatively, program code 2418 may be transferred to data processing system 2400 using computer readable signal media 2426. Computer readable signal media 2426 may be, for example, a propagated data signal containing program code 2418. This data signal may be an electromagnetic signal, an optical signal, and/or some other type of signal that can be transmitted over physical and/or wireless communications links.

The illustration of data processing system 2400 in FIG. 24 is not meant to provide architectural limitations to the manner in which the example embodiments may be implemented. The different example embodiments may be implemented in a data processing system that includes components in addition to or in place of those illustrated for data processing system 2400. Further, components shown in FIG. 24 may be varied from the illustrative examples shown.

Figure 25:
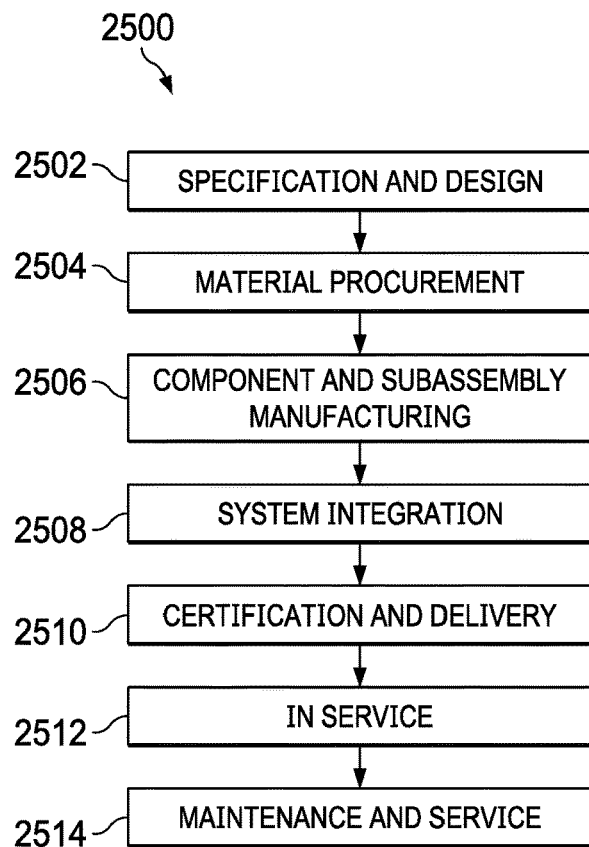
FIG. 25 is an illustration of an aircraft manufacturing and service method in accordance with an example embodiment.
Figure 26:
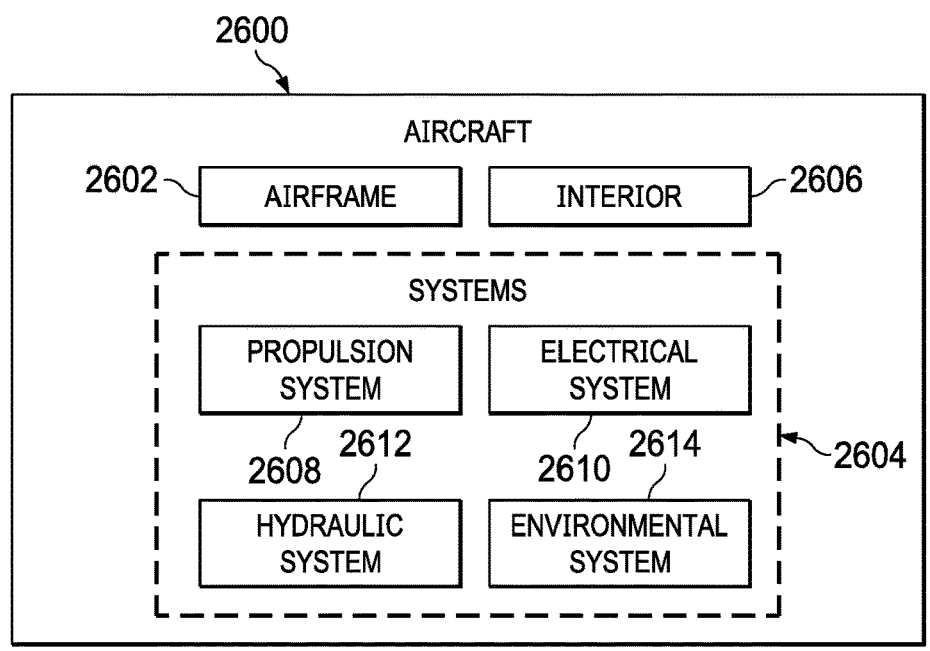
FIG. 26 is a block diagram of an aircraft in accordance with an example embodiment.

Example embodiments of the disclosure may be described in the context of aircraft manufacturing and service method 2500 as shown in FIG. 25 and aircraft 2600 as shown in FIG. 26. Turning first to FIG. 25, an illustration of an aircraft manufacturing and service method is depicted in accordance with an example embodiment. During pre-production, aircraft manufacturing and service method 2500 may include specification and design 2502 of aircraft 2600 in FIG. 26 and material procurement 2504.

During production, component and subassembly manufacturing 2506 and system integration 2508 of aircraft 2600 in FIG. 26 takes place. Thereafter, aircraft 2600 in FIG. 26 may go through certification and delivery 2510 in order to be placed in service 2512. While in service 2512 by a customer, aircraft 2600 in FIG. 26 is scheduled for routine maintenance and service 2514, which may include modification, reconfiguration, refurbishment, and other maintenance or service.

Each of the processes of aircraft manufacturing and service method 2500 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 26, an illustration of an aircraft is depicted in which an example embodiment may be implemented. In this example, aircraft 2600 is produced by aircraft manufacturing and service method 2500 in FIG. 25 and may include airframe 2602 with plurality of systems 2604 and interior 2606. Examples of systems 2604 include one or more of propulsion system 2608, electrical system 2610, hydraulic system 2612, and environmental system 2614. Any number of other systems may be included. Although an aerospace example is shown, different example embodiments may be applied to other industries, such as the automotive industry.

Apparatuses and methods embodied herein may be employed during at least one of the stages of aircraft manufacturing and service method 2500 in FIG. 25. In particular, assembly 304 from FIG. 3 or fuselage assembly 102 from FIG. 1 may be manufactured during any one of the stages of aircraft manufacturing and service method 2500. For example, without limitation, assembly system 302 from FIG. 3 or assembly system 413 from FIG. 4 may be used to join parts of assembly 304 from FIG. 3 or lap splice 400 from FIG. 4, respectively, during at least one of component and subassembly manufacturing 2506, system integration 2508, routine maintenance and service 2514, or some other stage of aircraft manufacturing and service method 2500. Further, assembly 304 or lap splice 400 may be used to form at least one of airframe 2602 or interior 2606 of aircraft 2600.

In one illustrative example, components or subassemblies produced in component and subassembly manufacturing 2506 in FIG. 25 may be fabricated or manufactured in a manner similar to components or subassemblies produced while aircraft 2600 is in service 2512 in FIG. 25. As yet another example, one or more apparatus embodiments, method embodiments, or a combination thereof may be utilized during production stages, such as component and subassembly manufacturing 2506 and system integration 2508 in FIG. 25. One or more apparatus embodiments, method embodiments, or a combination thereof may be utilized while aircraft 2600 is in service 2512 and/or during maintenance and service 2514 in FIG. 25. The use of a number of the different example embodiments may substantially expedite the assembly of and/or reduce the cost of aircraft 2600.

Thus, the example embodiments provide a method and apparatus for easily and efficiently performing automated fastener installation operations. The example embodiments describe single function end effectors that provide a single-sided (one-sided) clamp-up solution to maintain the clamping of parts while other single function end effectors are being swapped out on the opposite side.

Using single function end effectors that perform distinct, specialized tasks may provide for smaller, lighter, and less complex end effectors. The simplicity of these single function end effectors may improve the efficiency, reliability, and maintenance demands of these end effectors and may reduce the overall size of the supporting robotic devices to which these end effectors are coupled.

In one example embodiment, a method for performing a fastener installation is provided. A first mechanical force is applied to a first part and a second mechanical force is applied to a second part to form a clamp-up of the first part and the second part. Air is suctioned through a fastener hole, which is formed by a first hole in the first part that is aligned with a second hole in the second part, to pull the second part towards the first part and thereby maintain the clamp-up of the first part and the second part.

In still yet another example embodiment, a method is provided for aligning a first hole in a first panel with a second hole in a second panel to define a through-hole. A wall that defines the second hole is gripped from within the through-hole to pull the second panel towards the first panel and thereby establish a clamp-up of the first panel and the second panel.

In another example embodiment, a method for maintaining a clamp-up is provided. A first mechanical force and a second mechanical force are applied to a first part and a second part, respectively, to form the clamp-up. The first part forms a first side of the clamp-up and the second part forms a second side of the clamp-up. Air is suctioned, from the first side of the clamp-up, through a fastener hole that extends through the first part and the second part to pull the second part towards the first part. The first mechanical force and the second mechanical force are removed simultaneously while continuing to suction such that the suctioning independently maintains the clamp-up after removal of the first mechanical force and the second mechanical force.

In another example embodiment, a method is provided for maintaining a clamp-up. Air is suctioned from a first side of a clamp-up of a first part and a second part through a fastener hole formed by a first hole in the first part and a second hole in the second part to pull the second part towards the first part and thereby provide the clamp-up of the first part and the second part.

In yet another example embodiment, a method for maintaining a clamp-up is provided. A first end effector at a first side of a panel joint applies a first force via contact with the first side of a panel joint. A second end effector at a second side of the panel joint applies a second force that is equal and opposite to the first force via contact with the second side of the panel joint to establish the clamp-up. The first end effector at the first side of the panel joint maintains the clamp-up after the second end effector is removed from contact with the second side.

In still yet another example embodiment, a method for a single-sided clamp-up is provided. A single function end effector positioned at a first side of a panel joint applies a first force to a first panel of the panel joint. The single function end effector applies a second force that is equal and opposite to the first force to a second panel of the panel joint to thereby provide the single-sided clamp-up of the first panel and the second panel.

In another example embodiment, a method of providing a clamp-up is provided. The method includes reaching through a first hole in a first part to grip a wall that defines a second hole in a second part to thereby pull the second part against the first part.

In an example embodiment, an apparatus for maintaining a clamp-up comprises a nozzle and a suction device. The nozzle has a nozzle diameter greater than a hole diameter of a first hole in a first part. The nozzle is used to apply a first mechanical force to a first side of the clamp-up when engaged with the first part. The suction device is for suctioning air, from the first side of the clamp-up, through a fastener hole formed by the first hole in the first part and a second hole in a second part and through the nozzle. The air is suctioned with a volumetric flow rate sufficient to maintain the clamp-up of the first part and the second part from the first side without requiring an additional force at a second side of the clamp-up.

In another example embodiment, an apparatus for forming a clamp-up comprises an end effector. The end effector is positioned at a first side of a panel joint and applies a first clamp-up force to a first panel of a panel joint and an equal and opposite second clamp-up force to a second panel of the panel joint to provide the clamp-up.

The flowcharts and block diagrams in the different depicted embodiments illustrate the architecture, functionality, and operation of some possible implementations of apparatuses and methods in an example embodiment. In this regard, each block in the flowcharts or block diagrams may represent a module, a segment, a function, and/or a portion of an operation or step.

In some alternative implementations of an example embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required. For example, without limitation, "at least one of item A, item B, or item C" or "at least one of item A, item B, and item C" may mean item A; item A and item B; item B; item A, item B, and item C; item B and item C; or item A and C. In some cases, "at least one of item A, item B, or item C" or "at least one of item A, item B, and item C" may mean, but is not limited to, two of item A, one of item B, and ten of item C; four of item B and seven of item C; or some other suitable combination.

The description of the different example embodiments has been presented for purposes of illustration and description, and is not intended to be exhaustive or limited to the embodiments in the form disclosed. Many modifications and variations will be apparent to those of ordinary skill in the art. Further, different example embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for providing a clamp-up, the method comprising:
   suctioning, from a first side of a clamp-up of a first part and a second part, air through a fastener hole formed by a first hole in the first part and a second hole in the second part to pull the second part towards the first part and thereby provide the clamp-up of the first part and the second part.

2. The method of claim 1, wherein suctioning comprises:
   suctioning, from the first side of the clamp-up, the air through the fastener hole to grip a wall that defines the second hole in the second part to thereby pull the second part towards the first part,
   wherein a force static equilibrium is established by a suction force produced by the suctioning and a reactive force produced by a contact surface of a first tool at the first side of the clamp-up.

3. The method of claim 2, wherein a first mechanical force is applied by a first tool at the first side of the clamp-up and a second mechanical force is applied by a second tool at a second side of the clamp-up during the suctioning.

4. The method of claim 3, wherein the first mechanical force and the second mechanical force are applied at least until a force static equilibrium is established by a suction force produced by the suctioning and a reactive force produced by a contact surface of the first tool at the first side of the clamp-up.

5. The method of claim 4, further comprising:
   removing the first mechanical force and second mechanical force after the force static equilibrium has been reached, wherein the suction force and the reactive force provide the clamp-up of the first part and the second part without the first mechanical force and the second mechanical force.

6. The method of claim 1, further comprising:
   installing a fastener through the fastener hole while continuing to suction the air through the fastener hole, wherein suctioning is performed at least until the fastener is fully installed.

7. The method of claim 1, wherein suctioning, from the first side of the clamp-up of the first part and the second part, the air through the fastener hole comprises:
   suctioning, from the first side of the clamp-up, the air through the fastener hole in a direction towards the first part and at a volumetric flow rate sufficient to grip a wall that defines the second hole while overcoming a volume of suction lost at an open end of the second hole at a second side of the clamp-up.

8. The method of claim 1, further comprising:
   aligning the first hole in the first part and the second hole in the second part to form the fastener hole.

9. The method of claim 8, wherein aligning comprises:
   aligning the first hole with the second hole such that the first hole and the second hole are at least one of concentrically or coaxially aligned.

10. The method of claim 1, wherein a suction force produced by the suctioning is sufficient to provide the clamp-up during and after a fastener has been inserted through the fastener hole from a second side of the clamp-up.

11. The method of claim 1, further comprising:
    aligning a first hole in the first part with a second hole in a second part to define the fastener hole; and
    wherein the suctioning comprises:
      gripping a wall that defines the second hole from within the fastener hole to pull the second part towards the first part and thereby provide the clamp-up of the first part and the second part.

12. A portion of an aircraft assembled using the method of claim 1.

13. A method for maintaining a clamp-up, the method comprising:
    applying, by a first end effector at a first side of a panel joint, a first force via contact with the first side of a panel joint;
    applying, by a second end effector at a second side of the panel joint, a second force that is equal and opposite to the first force via contact with the second side of the panel joint to establish the clamp-up; and
    maintaining, by the first end effector at the first side of the panel joint, the clamp-up after the second end effector is removed from contact with the second side using a partial vacuum drawn through a fastener hole that passes through the panel joint.

14. The method of claim 13, further comprising:
    locating the fastener hole through the panel joint.

15. The method of claim 13, wherein the panel joint is a lap splice comprised of two skin panels.

16. The method of claim 13, further comprising:
    aligning a first hole in a first panel of the panel joint with a second hole in a second panel of the panel joint to define a fastener hole; and
    wherein maintaining the clamp-up comprises:
      gripping a wall that defines the second hole from within the fastener hole to pull the second panel towards the first panel and thereby maintain the clamp-up of the first panel and the second panel.

17. The method of claim 13, wherein maintaining the clamp-up comprises:
    applying a suction force on one part of the panel joint that forms the second side of the panel joint; and
    applying a reactive force on another part of the panel joint that forms the first side of the panel joint, wherein the suction force and the reactive force establish a force static equilibrium.

18. A method for providing a single-sided clamp-up:
    applying, by a single function end effector positioned at a first side of a panel joint, a first force to a first panel of the panel joint; and
    applying, by the single function end effector, a second force that is equal and opposite to the first force to a second panel of the panel joint to thereby provide the single-sided clamp-up of the first panel and the second panel, wherein the second force comprises a suction force.

19. The method of claim 18, wherein the panel joint is a lap splice and the first panel and the second panel are skin panels.

20. The method of claim 18, wherein applying the second force comprises:
applying the suction force, wherein the suction force pulls the second panel to the first panel.

21. The method of claim 20, wherein applying the first force comprises:
applying a reactive force in response to the suction force via a surface of a tool that is in contact with the first panel to thereby provide the single-sided clamp-up.

22. A method of providing a clamp-up, the method comprising:
reaching through a first hole in a first part to grip a wall that defines a second hole in a second part using suctioning of air through the first hole and the second hole to thereby pull the second part against the first part.

23. The method of claim 22, wherein reaching comprises:
creating a pressure differential that acts on the wall of the second hole in the second part to pull the second part against the first part.

24. The method of claim 22, wherein reaching comprises:
suctioning, by a suction device positioned relative to the first part, the air through the first hole and the second hole to pull the second part towards the first part.

25. The method of claim 22, further comprising:
aligning the first hole with the second hole at least one of concentrically or coaxially prior to reaching through the first hole in the first part to grip the wall.

26. The method of claim 22, further comprising:
applying a first mechanical force to the first part and a second mechanical force to the second part to form a clamp-up of the first part and the second part, the first part forming a first side of the clamp-up and the second part forming a second side of the clamp-up.

27. The method of claim 26, further comprising:
drilling through the clamp-up using a drilling tool positioned at the second side of the clamp-up to form the second hole in the second part and the first hole in the first part.

28. The method of claim 27, further comprising:
removing the first mechanical force and the second mechanical force, after the wall of the second hole has been gripped via the reaching step, wherein gripping of the wall maintains the clamp-up after the first mechanical force and the second mechanical force have been removed.

29. The method of claim 22, wherein the first part and the second part are skin panels that form a panel joint.

* * * * *